United States Patent
Niu et al.

(10) Patent No.: US 11,441,051 B2
(45) Date of Patent: Sep. 13, 2022

(54) 3D HYBRID COMPOSITE COATING

(71) Applicant: UWM Research Foundation, Inc., Milwaukee, WI (US)

(72) Inventors: Junjie Niu, Whitefish Bay, WI (US); Yongsuk Kim, Gimpo-si (KR)

(73) Assignee: UWM Research Foundation, Inc., Milwaukee, WI (US)

( * ) Notice: Subject to any disclaimer, the term of this patent is extended or adjusted under 35 U.S.C. 154(b) by 134 days.

(21) Appl. No.: 16/964,685

(22) PCT Filed: Jan. 25, 2019

(86) PCT No.: PCT/US2019/015184
§ 371 (c)(1),
(2) Date: Jul. 24, 2020

(87) PCT Pub. No.: WO2019/147959
PCT Pub. Date: Aug. 1, 2019

(65) Prior Publication Data
US 2020/0347262 A1     Nov. 5, 2020

Related U.S. Application Data

(60) Provisional application No. 62/622,244, filed on Jan. 26, 2018.

(51) Int. Cl.
*C09D 163/00* (2006.01)
*C09D 7/62* (2018.01)
(Continued)

(52) U.S. Cl.
CPC ............. *C09D 163/00* (2013.01); *C09D 7/62* (2018.01); *C09D 127/22* (2013.01); *B05D 1/02* (2013.01);
(Continued)

(58) Field of Classification Search
None
See application file for complete search history.

(56) References Cited

U.S. PATENT DOCUMENTS

| 4,178,318 A | 12/1979 | Cheung |
| 4,610,762 A | 9/1986 | Birdwell |

(Continued)

FOREIGN PATENT DOCUMENTS

| CA | 920727 A | 2/1973 |
| CN | 101824273 B | * 1/2013 |

(Continued)

OTHER PUBLICATIONS

"Illustrated Glossary of Organic Chemistry—Wavy line (squiggly line)", www.chem.ucla.edu/~harding/IGOC/W/wavy_line.html#:~:text= Wavy line (squiggly line)%3A,group is unspecified or unimportant, retrieved Apr. 2022. (Year: 2022).*

(Continued)

*Primary Examiner* — Nicole M. Buie-Hatcher
(74) *Attorney, Agent, or Firm* — Michael Best & Friedrich LLP

(57) ABSTRACT

A coating composition comprises a functionalized epoxy resin and a fluoroalkyl-modified particle, such as activated carbon or silica. The functionalized epoxy resin is a ternary polymer composition comprising one or more epoxy resin moieties linked to a polyethylene backbone through an oxygen atom, fluoroalkyl(poly)propionyl groups being grafted to the polyethylene backbone. The coating compositions have superhydrophobic properties useful for self-cleaning surfaces and bubble release from sensors.

20 Claims, 26 Drawing Sheets

(51) Int. Cl.
    *C09D 127/22*      (2006.01)
    *B05D 1/02*      (2006.01)
    *B05D 1/18*      (2006.01)
    *B05D 1/28*      (2006.01)
    *C08K 3/36*      (2006.01)
    *C08K 9/04*      (2006.01)

(52) U.S. Cl.
CPC ............... *B05D 1/18* (2013.01); *B05D 1/28* (2013.01); *B05D 2504/00* (2013.01); *B05D 2506/10* (2013.01); *C08K 3/36* (2013.01); *C08K 9/04* (2013.01)

(56) References Cited

U.S. PATENT DOCUMENTS

| | | | |
|---|---|---|---|
| 4,784,882 | A | 11/1988 | Birdwell et al. |
| 6,495,624 | B1 | 12/2002 | Brown |
| 7,268,179 | B2 | 9/2007 | Brown |
| 7,351,498 | B2 | 4/2008 | Watarai et al. |
| 7,608,676 | B2 | 10/2009 | Fenn et al. |
| 7,629,400 | B2 | 12/2009 | Hyman |
| 7,842,762 | B2 | 11/2010 | Zawacky et al. |
| 8,211,969 | B2 | 7/2012 | Zou et al. |
| 8,293,442 | B2 | 10/2012 | Watanabe et al. |
| 8,833,430 | B2 | 9/2014 | Aizenberg et al. |
| 8,999,307 | B2 | 4/2015 | Ranade et al. |
| 9,005,591 | B2 | 4/2015 | Ranade et al. |
| 9,068,089 | B2 | 6/2015 | Van Buskirk et al. |
| 2007/0009657 | A1 | 1/2007 | Zhang et al. |
| 2008/0015298 | A1 | 1/2008 | Xiong et al. |
| 2010/0036053 | A1 | 2/2010 | Aten et al. |
| 2011/0053050 | A1 | 3/2011 | Lim et al. |
| 2011/0207905 | A1 | 8/2011 | Jones |
| 2012/0052234 | A1 | 3/2012 | Natarajan et al. |
| 2012/0201965 | A1* | 8/2012 | Soucek ............... C08F 220/14 524/508 |
| 2013/0090417 | A1 | 4/2013 | Lin et al. |
| 2013/0115420 | A1 | 5/2013 | Park et al. |
| 2014/0113144 | A1 | 4/2014 | Loth et al. |
| 2017/0292037 | A1* | 10/2017 | Kimura ............... C09D 127/12 |
| 2018/0072829 | A1 | 3/2018 | Amin-Sanayei et al. |

FOREIGN PATENT DOCUMENTS

| | | |
|---|---|---|
| WO | WO2006124670 A2 | 11/2006 |
| WO | WO2013110740 A1 | 8/2013 |
| WO | WO2015177229 A2 | 11/2015 |
| WO | WO2017189388 A1 | 11/2017 |

OTHER PUBLICATIONS

Machine translation of CN 101824273 B, retrieved Apr. 2022. (Year: 2022).*
Aftab et al., "Amenability of Carboxylic Acids Adsorption on Surface of Activated Carbon," Pak. J. sci. ind. Res. Ser. A: phys. Sci., 2015, 58(2):106-110.
Alexander, S., et al., Branched hydrocarbon low surface energy materials for superhydrophobic nanoparticle derived surfaces. ACS Appl. Mater. Interfaces 2016, 8 (1), 660-666.
Belova, Selective Ultrasonic Cavitation on Patterned Hydrophobic Surfaces, Angewandte Chemie International Ed. 2010, 49, 7129.
Bhushan, B., et al., Micro-, nano-and hierarchical structures for superhydrophobicity, self-cleaning and low adhesion. Philosophical Transactions of the Royal Society of London A Math. Phys. Eng. Sci. 2009, 367, 1631-1672.
Brennan, J. C.; et al., Flexible conformable hydrophobized surfaces for turbulent flow drag reduction., Sci. Rep. 2015, 5, 1-10.
Cassie, A.; et al., Wettability of porous surfaces. Trans. Faraday Soc. 1944, 40, 546-551.
Coope, T. S.; et al., Metal Triflates as Catalytic Curing Agents in Self-Healing Fibre Reinforced Polymer Composite Materials. Macromol. Mater. Eng. 2014, 299 (2), 208-218.
Cui, S.; et al., Fabrication of robust gold superhydrophobic surface on iron substrate with properties of corrosion resistance, self-cleaning and mechanical durability. Journal of Alloys and Compounds 2017, 728, 271-281.
Cui, Z.; et al., Recent progress in fluoropolymers for membranes. Prog. Polym. Sci. 2014, 39, 164-198.
Danish Ministry of the Environment, "Survey of Bisphenol A and Bisphenol-A-diglycidylether polymer," Part of the LOUS-review, Environmental Project No. 1483, 2013.
Weixing et al. In Curing Kinetics of silicone epoxy resin containing fluorene, Adv. Mat. Res. 2014, 28-33.
Heden, M., et al., Molecular fusion within fullerene clusters induced by femtosecond laser excitation, Eur. Phys. J. D 43, 255-259 (2007).
Erbil, H. Y.; et al., Transformation of a simple plastic into a superhydrophobic surface. Science 2003, 299 (5611), 1377-1380.
Feng, X.; et al., Design and creation of superwetting/antiwetting surfaces. Adv. Mater. 2006, 18 (23), 3063-3078.
Ross, G., et al., Surface modification of poly(vinylidenefluoride) by alkaline treatment. 1. The degradation mechanism, Polymer 41(2000) 1685-1696.
Haponska et al., "PVDF Membrane Morphology—Influence of Polymer Molecular Weight and Preparation Temperature," Polymers, 2017, 9, 718.
International Preliminary Report on Patentability for Application No. PCT/US2019/015184 dated Aug. 6, 2020 (8 pages).
International Search Report and Written Opinion for Application No. PCT/US2019/015184 dated May 15, 2019 (18 pages).
Feng, et al., Ammonia-assisted dehydrofluorination between PVDF and Nafion for highly selective and low-cost proton exchange membranes: a possible way to further strengthen the commercialization of Nafion, J. Mater. Chem. A, 2015, 3, 12609-12615.
Jiang, L.; et al., A lotus-leaf-like superhydrophobic surface: a porous microsphere/nanofiber composite film prepared by electrohydrodynamics, Angewandte Chemie Int Ed, 2004, 43, 4338-4341.
Joung, Y. et al., Antiwetting fabric produced by a combination of layer-by-layer assembly and electrophoretic deposition of hydrophobic nanoparticles. ACS Appl. Mater. Interfaces 2015, 7, 20100-20110.
Kang, G.-d.; et al., Application and modification of poly(vinylidene fluoride) (PVDF) membranes—A review. J. Membr. Sci. 2014, 463, 145-165.
Khurana, P.; et al., Studies on the curing and thermal behaviour of DGEBA in the presence of bis(4-carboxyphenyl) dimethyl silane. Polymer International, 2003, 52 (6), 908-917.
Kim et al., "Strong Hydrophobic Coating by Conducting a New Hierarchical Architecture," J. Phys. Chem. C 2018, 122, 8, 4628-4634.
Koehlert, "Activated Carbon: Fundamentals and New Applications," Chemical Engineering, May 2017, (9 pages).
Lafuma, A.; et al., Superhydrophobic states. Nat. Mater. 2003, 2 (7), 457-460.
Lau, K. K.; et al., Superhydrophobic carbon nanotube forests. Nano letters 2003, 3 (12), 1701-1705.
Li, H.; et al., A robust superhydrophobic surface and origins of its self-cleaning properties. Applied Surface Science 2017, 420, 336-345.
Liu et al., "Acryloylmorpholine-Grafted PVDF Membrane with Improved Protein Fouling Resistance," Ind. Eng. Chem. Res. 2013, 52, 18392-18400.
Lu, Y.; et al., Robust self-cleaning surfaces that function when exposed to either air or oil. Science 2015, 347 (6226), 1132-1135.
McCleaf et al., Removal efficiency of multiple poly- and perfluoroalkyl substances (PFASs) in drinking water using granular activated carbon (GAC) and anion exchange (AE) column tests, Water Research 120 (2017) 77-87.
Meng et al., "Superhydrophobic carbon-based materials: a review of synthesis, structure, and applications," Carbon Letters, 2014, 15(2):89-104.
Wang, et al., Multifunctional superhydrophobic surfaces templated from innately microstructured hydrogel matrix. Nano Letters, 14, 4803-4809. 2014.

(56) References Cited

OTHER PUBLICATIONS

Nils Malmgren AB, "Epoxy plastics' general chemical and physical properties," <http://www.nilsmalmgren.com/epoxy-chemistry/epoxy-plastics-general-chemical-and-physical-properties/> publicly available at least as early as Dec. 8, 2018.

Niu, J. J.; et al., A novel self-cleaning coating with silicon carbide nanowires. The Journal of Physical Chemistry B 2009, 113 (9), 2909-2912.

Ochoa-Herrera et al., "Removal of perfluorinated surfactants by sorption onto granular activated carbon, zeolite and sludge," Chemosphere 72 (2008) 1588-1593.

Onda, T.; et al., Super-water-repellent fractal surfaces. Langmuir 1996, 12 (9), 2125-2127.

Parkin, I. P.; et al., Self-cleaning coatings. J. Mater. Chem. 2005, 15 (17), 1689-1695.

Polymer Science Learning Center, "Making Epoxy Monomers and Polymers," <https://pslc.ws/macrog/eposyn.htm> publicly available at least as early as Dec. 8, 2018.

Bhushan, Natural and biomimetic artificial surfaces for superhydrophobicity, self-cleaning, low adhesion, and drag reduction, Progress in Materials Science, 2011, 56, 1-108.

Qin, S.; et al., Functionalization of single-walled carbon nanotubes with polystyrene via grafting to and grafting from methods. Macromolecules 2004, 37 (3), 752-757.

Ragesh, P.; et al., A review on 'self-cleaning and multifunctional materials' J. Mater. Chem. A 2014, 2 (36), 14773-14797.

Roy, D.; et al., Cellulose modification by polymer grafting: a review. Chem. Soc. Rev. 2009, 38 (7), 2046-2064.

Senevirathna et al., "Adsorption of four perfluorinated acids on non-ion exchange polymer sorbents," Water Science & Technology, 2011, 2106-2113.

Shafique et al., "Adsorption of perfluorocarboxylic acids at the silica surface," Chem. Commun., 2017, 53, 589.

Shen et al., "The construction of a zwitterionic PVDF membrane surface to improve biofouling resistance," Biofouling, 2013, 29(8):991-1003.

Solef, "PVDF Design & Processing Guide," Version 2.7 dated Dec. 2017, (64 pages).

SSI Technologies, "TULC Application Note Temperature Ultrasonic Level and Concentration Sensor for Urea, Diesel Exhaust Fluid (DEF), AdBlue Tanks," Copyright Dec. 14, 2012, Revision 2, (6 pages).

Su, F.; et al., Facile fabrication of superhydrophobic surface with excellent mechanical abrasion and corrosion resistance on copper substrate by a novel method. ACS Appl. Mater. Interfaces 2014, 6(11), 8762-8770.

Sun, T.; et al., Bioinspired surfaces with special wettability. Acc. Chem. Res. 2005, 38 (8), 644-652.

Tian, H.; Wang, F.; Ge, S.; Ou, J.; Li, W.; Yu, S., A simple and effective way to fabricate mechanical robust superhydrophobic surfaces. RSC Advances 2016, 6 (34), 28563-28569.

Tuteja, A.; et al., Designing superoleophobic surfaces. Science 2007, 318, 1618-1622.

Zhang, W., et al., Superhydrophobic and superoleophilic PVDF membranes for effective separation of water-in-oil emulsions with high flux, Adv. Mater. 25 (2013) 2071-2076.

Wako, "AAzo Polymerization Initiators Comprehensive Catalog 25" Version 160420 K1 SI, publicly available at least as early as Jan. 12, 2019, (36 pages).

Wang, et al., "Facile preparation of superamphiphobic epoxy resin/ modified poly(vinylidene fluoride)/fluorinated ethylene propylene composite coating with corrosion/wear resistance;" Applied Surface Science, 357, 229-235 (2015).

Wu, D.; et al., Curvature-Driven Reversible In Situ Switching Between Pinned and Roll-Down Superhydrophobic States for Water Droplet Transportation. Adv. Mater. 2011, 23 (4), 545-549.

Wu, G.; et al., A Versatile Approach towards Multifunctional Robust Microcapsules with Tunable, Restorable, and Solvent-Proof Superhydrophobicity for Self-Healing and Self-Cleaning Coatings. Adv. Funct. Mater. 2014, 24 (43), 6751-6761.

Li, X., et al., Desalination of dye solution utilizing PVA/PVDF hollow fiber composite membrane modified with $TiO_2$ nanoparticles, J. Membr. Sci. 471 (2014) 118-129.

Xia, F.; et al., Bio-inspired, smart, multiscale interfacial materials. Adv. Mater. 2008, 20 (15), 2842-2858.

Xiao, et al., "Polymerization and Functionalization of Membrane Pores for Water Related Applications," Ind. Eng. Chem. Res., 2015, 54:4174-4182.

Yuan, J.; et al., Superwetting nanowire membranes for selective absorption. Nat. Nanotechnology 2008, 3 (6), 332-336.

Zhi, "Sorption of Perfluoroalkyl and Polyfluoroalkyl Substances (PFASs) by Natural and Anthropogenic Carbonaceous Sorbents," Department of Civil Engineering and Applied Mechanics, McGill University, Montreal, Quebec, Canada, Mar. 2017, (215 pages).

Zhu, T.; et al., Rational design of multi-layered superhydrophobic coating on cotton fabrics for UV shielding, self-cleaning and oil-water separation. Materials & Design 2017, 134, 342-351.

Zhuang, A.; et al., A simple method to make mechanically robust, adhesive and superhydrophobic surface based on epoxy resin. J. Coating. Tech. Res. 2015, 12 (3), 609-615.

\* cited by examiner

| Coating types | EP | | | | Loctite | | | | Composites | | |
|---|---|---|---|---|---|---|---|---|---|---|---|
| Mechanical properties | Avg. SF Force (mN) | Avg. LF (μm) | Modulus (Gpa) | Hardness (Gpa) | Avg. SF Force (mN) | Avg. LF (μm) | Modulus (Gpa) | Hardness (Gpa) | Avg. SF Force (mN) | Avg. LF (μm) | Modulus (Gpa) | Hardness (Gpa) |
| Mean | 287 | 776 | 9.0 | 0.15 | 235 | 667 | 7.4 | 0.16 | N/A | N/A | 9.0 | 0.17 |
| Standard Deviation | | | 0.76 | 0.07 | | | 0.39 | 0.01 | | | 0.96 | 0.02 |

* SF: Scratch Failure
* LF: Length to Failure

FIG. 6

| Samples | Method | Contact angle | Mechanical Stability | Chemical/mechanical stability | Scalable or not | Transparency | Application |
|---|---|---|---|---|---|---|---|
| PTFE coated carbon nanotubes | Plasma enhanced chemical vapor deposition | 170° | N/A | N/A | No | No | Fillers for nanocomposites and single strand conductors in molecular electronics |
| $TiO_2$ | Painting | 168° | Sandpaper abrasion test (#240, 40 cycles) | N/A | Yes | No | Clothes, paper, glass, and steel for self-cleaning applications |
| Particle-filled silicone rubber composites | Drop casting | 164.9°±2.2° | Sandpaper abrasion test (#400, 32.5kpa, 50cycles) | N/A | Yes | Semi-transparent | Self-cleaning |
| Nanoflower like gold | Chemical deposition | 169° | Sandpaper abrasion test (#400, 30kpa, 2m) | pH=2,7 and 9 | No | No | Anti-corrosion, self-cleaning, and mechanical durability |
| ZnO-polydimethylsiloxane | Chemical bath deposition | 160° | Sandpaper abrasion test (45kpa, 300cycles); accelerate | CA kept 148°-168° when immersed in solution with pH from 1 to 13, for 24, 48 and 72h. | Yes | No | Self-cleaning and water oil separation |
| CuO | Electrodeposition and chemical oxidation | 160° | CA≥150° after stored in air for 6 month | CA≥150° when pH from 1 to 10 | Yes | Yes | Self-cleaning |
| Current work | Flexible with scalable methods | 160-165° | Sandpaper abrasion test (26.1kpa, 50 cycles) | High CA at pH=2,7 and 9 | Yes | Yes | Most of self-cleaning substrates such as metal, glass and plastic |

FIG. 10

Sensor 5 | Sensor 7
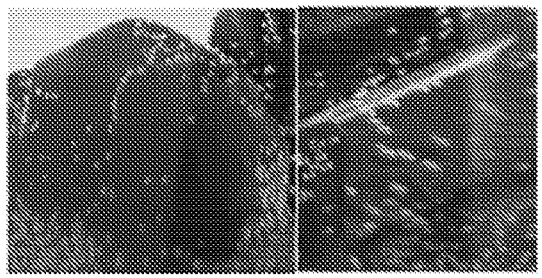 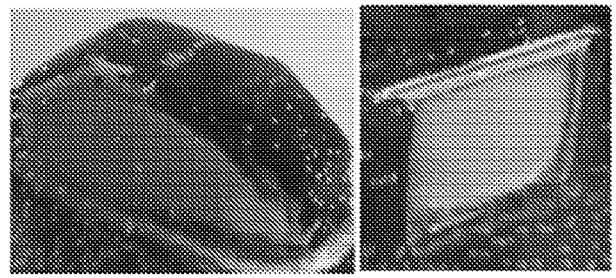
FIG. 14D
Sensor 5 | Sensor 7
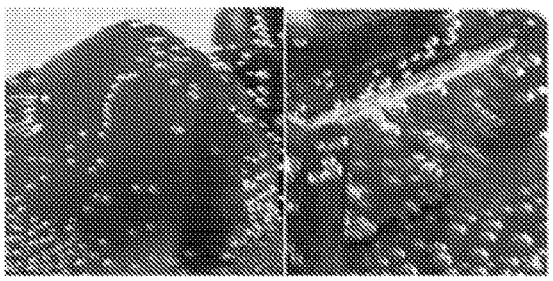 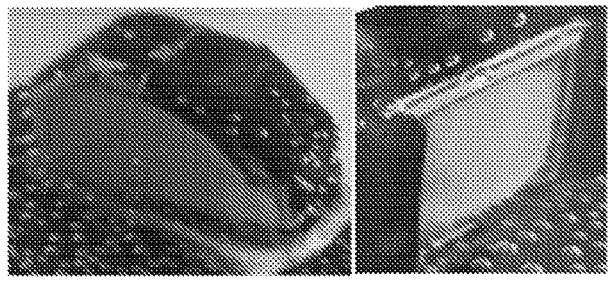
FIG. 14E
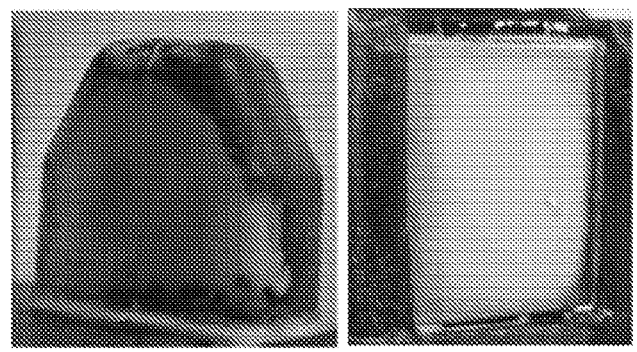
FIG. 15A

3D HYBRID COMPOSITE COATING

CROSS-REFERENCE TO RELATED APPLICATIONS

This application is the U.S. national stage entry, under 35 U.S.C. § 371, of International Application Number PCT/US2019/015184, filed Jan. 25, 2019, which claims priority to U.S. Provisional Application No. 62/622,244, filed Jan. 26, 2018, the entire contents of each of which are hereby incorporated by reference.

STATEMENT OF GOVERNMENT INTEREST

This invention was made with government support under grant number IIP0968887 awarded by the National Science Foundation. The government has certain rights in the invention.

TECHNICAL FIELD

The present disclosure relates to coating compositions with applications in self-cleaning surfaces and sensors.

BACKGROUND

Artificial hydrophobic surfaces that display water contact angles (CA) over 150° and inspired from the 'lotus leaf' have stimulated extensive studies in interdisciplinary fields. In particular, a well-engineered architecture with a nano-sized roughness exhibits a capability to trap micro-pockets of air between liquid and solid interface, thereby leading to hydrophobicity. On the basis of biomimicry from nature, synthetic surfaces have been recently developed using a series of technologies including chemical vapor/electrophoretic deposition, fiber, nanowire assemblies, polymer membrane casting, and electrospinning. To date, scientists have made remarkable progress in developing superhydrophobic coatings with a CA greater than 150 even up to 170°. Epoxy (EP) expresses a high adhesion force to substrates, but most epoxys are composed of hydrophilic groups and present a low hydrophobicity and thus have not been found suitable for superhydrophobic materials.

In addition to hydrophobicity, an ideal self-cleaning coating should also have a strong mechanical and chemical stability. However, this significant property that determines the coating shelf time, particularly under destructive/corrosive conditions, is less developed. While the hydrophobicity for a self-cleaning surface is feasibly obtained via rational designs of nano-structured materials, the longevity of these coatings is minimal due to the rapid function loss and weak interface bonding. Coatings containing nanostructured hetero-architectures have difficulty preserving their morphology following mechanical and/or corrosion testing. Further, these nano-coatings are not scalable, and especially not suitable for industrial applications. Therefore, there is a need for a self-cleaning surface coating that has high mechanical and chemical resistance.

SUMMARY

Disclosed herein is the synthesis of a flexible self-cleaning coating with improved mechanical and chemical stability on the basis of a new hierarchical architecture, which is comprised of a functionalized epoxy resin and industrially available activated carbon or silica. The strong bonding force from bisphenol A diglycidyl ether-derived epoxys contributes to high rigidity, high toughness and high temperature tolerance while the ether linkages lead to high chemical resistance. A greatly enhanced adhesion to substrate originates from the preferable interface ring-opening reaction of highly reactive ethylene oxide on epoxy with amine groups on a curing agent. The superhydrophobicity is ascribed to the interaction amongst hydrophobic groups on 'grafted' fluoroalkyl acrylate and functionalized particles. Compositions of the invention have hydrophobic and mechanical properties suitable for self-cleaning coatings in commercial products.

In one aspect, the invention provides a coating composition comprising:
(a) a ternary polymer composition comprising
  (i) a fluoropolymer comprising a polyethylene backbone optionally containing one or more double bonds, the polyethylene backbone being substituted with a plurality of fluoro groups and optionally a plurality of oxygen atoms;
  (ii) a plurality of fluoroalkyl(poly)propionyl groups grafted to the polyethylene backbone; and
  (iii) one or more epoxy resin moieties linked to the polyethylene backbone through an oxygen atom; and
(b) a fluoroalkyl-modified particle.

Another aspect of the invention provides a coating composition prepared by reacting a dehydrofluorinated polyvinylidene fluoride polymer with a fluoroalkylacrylate, a radical initiator, an epoxy resin, and a fluoroalkyl-modified particle.

Another aspect of the invention provides a method of preparing a coating composition of the invention comprising reacting a dehydrofluorinated polyvinylidene fluoride polymer with a fluoroalkylacrylate, a radical initiator, an epoxy resin, and a fluoroalkyl-modified particle.

Still another aspect of the invention provides an article coated with the coating composition of the invention.

BRIEF DESCRIPTION OF THE DRAWINGS

FIG. 3A shows a hybrid hierarchical structure with a micro-/nano-roughness that comprises the f-ACs as skeleton and the f-EP as joining. FIG. 3B shows a hybrid hierarchical structure with a micro-/nano-roughness that comprises the f-ACs as skeleton and the f-EP as joining. FIG. 3C shows an enlarged cross-section off-AC rigorously encapsulated by the f-EP, forming an intersecting network. The morphology evolution of the composite framework on paper towels before and after curing was recorded in FIG. 3D (before) and FIG. 3E (after). Elemental mappings of F, C and O from a cross-section of the composite via EDX are shown in FIG. 3F.

FIG. 6 is a chart showing the ramping load scratch test results of lab-made pure EP, Loctite EP, and the hybrid composite coated on glasses.

FIG. 10 is a chart showing a comparison of different self-cleaning coatings.

FIG. 11A shows Sensor 7 before the analysis. Images were taken at the start of the bubble nucleation assay (FIG. 11B) and at 2 hours (FIG. 11C), 4 hours (FIG. 11D) and 24 hours (FIG. 11E) during the assay.

FIGS. 14A-14E are images of Sensor 7 and Sensor 5 (uncoated baseline) during bubble nucleation analysis. Images were taken at the start of the bubble nucleation assay (FIG. 14A) and at 2 hours (FIG. 14B), 4 hours (FIG. 14C), 6 hours (FIG. 14D) and 24 hours (FIG. 14E) during the assay.

FIGS. 15A-15J are images of Sensor 7 during resistance analysis. Images were taken at the start of the assay (FIG. 15A) and at 1 day (FIG. 15B), 2 days (FIG. 15C), 3 days (FIG. 15D), 6 days (FIG. 15E), 7 days (FIG. 15F), 8 days (FIG. 15G), 9 days (FIG. 15H), 10 days, (FIG. 15I) and 12 days (FIG. 15J).

DETAILED DESCRIPTION

Figure 1:
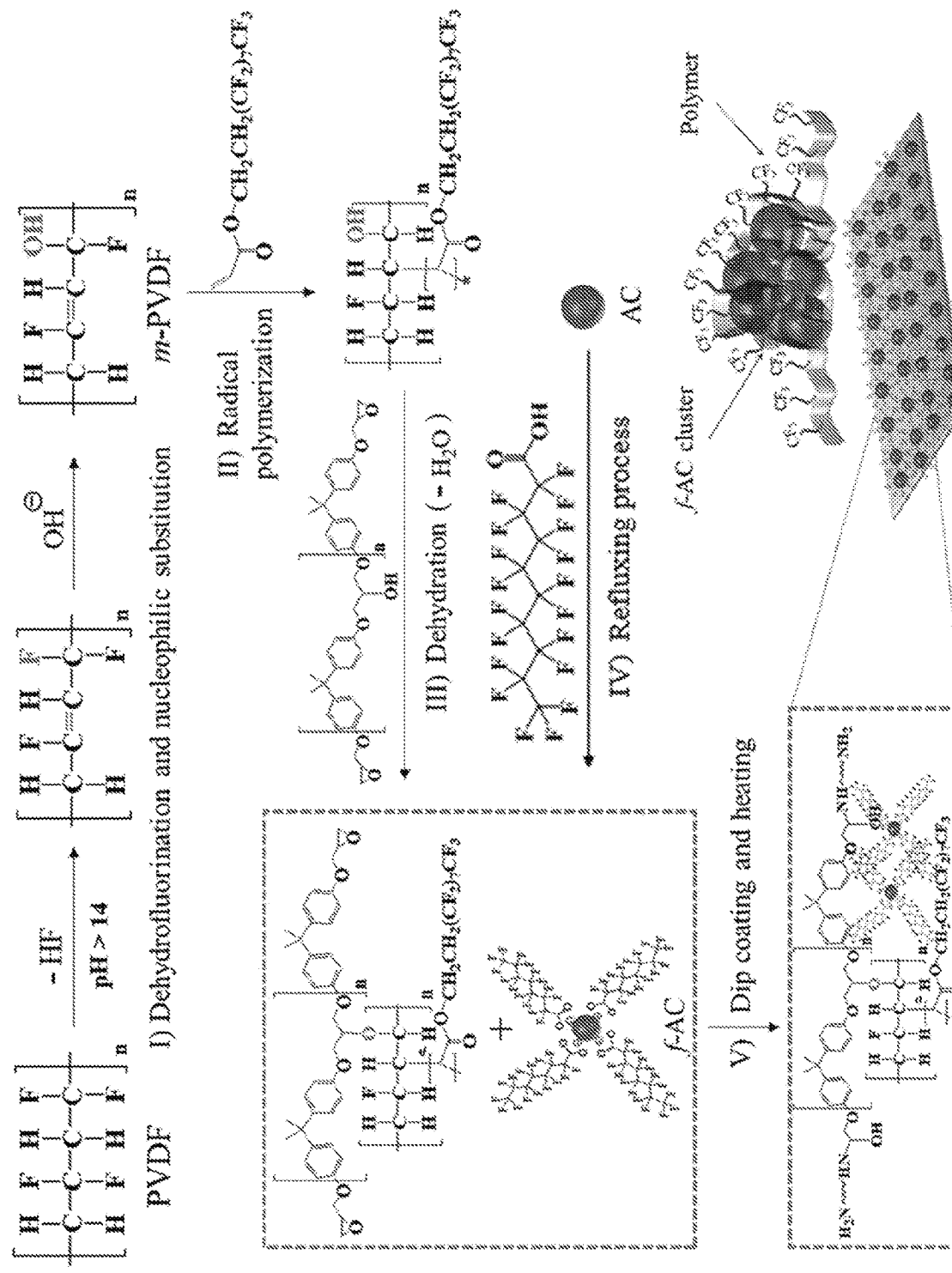
FIG. 1 is a proposed synthetic pathway to certain compositions described herein.

Disclosed herein is a high mechanical strength, high anti-corrosion, and high flexibility self-cleaning coating synthesized using commercial EP and industry-wide activated carbons (ACs) or silica as precursors via a facile chemical method. This hybrid composite coating with scalable production displayed an improved superhydrophobicity with a CA up to 162°. The enhanced mechanical property due to the strong bonding in EP matrix after a series of polymerizations may allow the coating to have a lifespan over years. In addition, the self-cleaning coating demonstrates flexibility on transparency and versatile substrates by applying a scalable coating processes.

To improve the hydrophobicity, the coating compositions display a hierarchical configuration, which contains a micro-/nano-roughness as well as low-energy functional groups with a similarity to lotus leaf. This hetero-architecture was created through a rational design of AC particles. The ACs with varying primary sizes ranging from several to tens of micrometers and secondary sizes ranging from tens to hundreds of nanometers provide a hierarchical geometry with a mean surface roughness of 15 μm.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

The term "alkoxy," as used herein, refers to a group alkyl-O—. Representative examples of alkoxy include, but are not limited to, methoxy, ethoxy, propoxy, 2-propoxy, butoxy and tert-butoxy.

The term "alkyl," as used herein, means a straight or branched, saturated hydrocarbon chain. The term "$C_{1-6}$alkyl" means a straight or branched chain hydrocarbon containing from 1 to 6 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "alkoxyalky," as used herein, refers to an alkoxy group, as defined herein, appended to the parent molecular moiety through an alkylene group.

The term "alkylene," as used herein, refers to a divalent group derived from a saturated straight or branched chain hydrocarbon. Representative examples of alkylene include, but are not limited to, —$CH_2CH_2$—, —$CH_2CH_2CH_2$—, —$CH_2CH_2CH_2CH_2$—, and —$CH_2CH_2CH_2CH_2CH_2$—.

The term "fluoroalkyl," as used herein, means an alkyl group, as defined herein, in which one or more hydrogen atoms are replaced by fluorine.

The term "carboxyalkyl," as used herein, refers to a group COOH appended to the parent molecular moiety through an alkylene group.

Definitions of specific functional groups and chemical terms are described in more detail below. For purposes of this disclosure, the chemical elements are identified in accordance with the Periodic Table of the Elements, CAS version, Handbook of Chemistry and Physics, 75*$^{th}$Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. COATING COMPOSITION

Coating compositions of the invention include a polymer material that may be derived from an epoxy, poly(vinylidene fluoride) (PVDF), and a fluoroalkylacrylate. A first polymer component may be prepared by dehydrofluorination of PVDF under alkaline conditions to provide a dehydrofluorinated PVDF (Def-PVDF), which may be a fluoropolymer comprising a polyethylene backbone containing one or more double bonds, the polyethylene backbone being substituted with a plurality of fluoro groups and optionally a plurality of oxygen atoms. PVDF dehydrofluorination may be conducted under a variety of conditions, such as subjecting the PVDF to 5-15% aqueous KOH/NaOH, containing an optional ethanol co-solvent, from room temperature up to about 60-70° C. Reaction times may vary from 10 minutes up to 24 hours. Preferably, PVDF is treated with 5% aqueous NaOH at room temperature for 12 hours.

The starting PVDF may have a weight average molecular weight of about 50,000 to about 1,000,000 (e.g., 50-100 k, 100-150 k, 150-200 k, 200-250 k, 250-300 k, 300-350 k, 350-400 k, 400-450 k, 450-500 k, 500-550 k, 550-600 k, 600-650 k, 650-700 k).

Dehydrofluorination of PVDF, as described herein, may introduce unsaturation and oxygen functionality into the polymer backbone of PVDF. Se Wang et al., *Applied Surface Science* (2015) 357, 229-235; Liu et al., *Ind. Eng. Chem. Res.* (2013) 52, 18392-18400; Ross et al., *Polymer* (2000) 1685-1696. Unsaturation may include monomer units such as

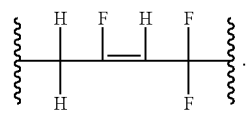

Def-PVDF may still include various units of saturated fluoroalkane such as

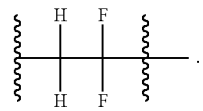

Oxygen atoms introduced in the Def-PVDF may be in the form of an alcohol, ketone, and/or β-diketone (including enol form).

The Def-PVDF may be reacted with a fluoroalkylacrylate monomer

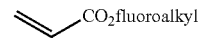

by a radical grafting reaction to append one or more fluoroalkylpropionyl units

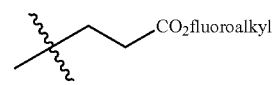

to the polymer backbone of the Def-PVDF and thereby produce a grafted Def-PVDF (g-Def-PVDF). The fluoroalkylacrylate units may react with unsaturated carbon-carbon bonds in the Def-PVDF polymer backbone to append a single fluoroalkylpropionyl at the site of a double bond, or radical chain extension may occur to add one or more additional fluoroalkylacrylate units (e.g.,

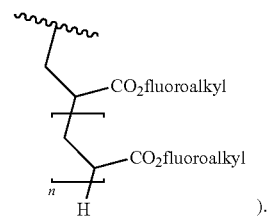

).

The fluoroalkyl moiety may be a $C_{8-15}$fluoroalkyl, such as for example, heptadecafluorodecyl (—$CH_2CH_2(CF_2)_7CF_3$). The radical grafting reaction thus may produce a fluoropolymer g-Def-PVDF comprising a polyethylene backbone optionally containing one or more double bonds, the polyethylene backbone being substituted with a plurality of fluoro groups and optionally a plurality of oxygen atoms; and a plurality of fluoroalkyl(poly)propionyl groups grafted to the polyethylene backbone. For example, the g-Def-PVDF may comprise a plurality of units selected from the group consisting of

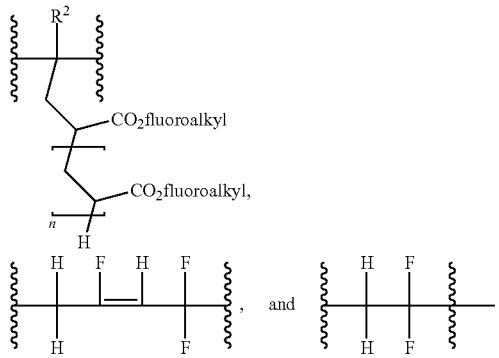

incorporated into the backbone, wherein each $R^2$ is independently hydrogen or fluoro; and n is ≥0.

The Def-PVDF:fluoroalkylacrylate monomer weight ratio may range from about 20:1 to about 1:1. In some embodiments, the Def-PVDF:fluoroalkylacrylate monomer is about 10:1, about 9:1, about 8:1, about 7:1, about 6:1, about 5:1, about 4:1, about 3:1, about 2:1, or about 1:1. In a preferred embodiment, the Def-PVDF:fluoroalkylacrylate monomer weight ratio is about 1:1. The degree of grafting of fluoroacrylate monomer onto the main chain may vary according to the weight ratio.

The radical grafting reaction may be conducted in any suitable organic solvent (e.g., DMF) and with radical initiators known in the art, such as benzoyl peroxide, azobisisobutyronitrile, lauryl peroxide, tertiary butyl peracetate, tertiary butyl perpivalate, tertiary butyl hydroperoxide or diisopropyl peroxy carbonate.

Preferred radical initiators are azo polymerization initiators including those of general formula

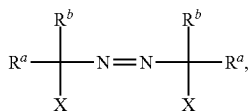

or a salt thereof, wherein X is CN, —$CO_2C_{1-6}$alkyl, —C(O)NH$C_{1-6}$alkyl, —C(O)NH—$C_{1-4}$alkylene-OH, —C(NH)NH$_2$, —C(NH)NH$C_{1-6}$alkyl, —C(NH)NH—$C_{1-4}$alkylene-$CO_2$H, imidazoline; $R^a$ and $R^b$ are independently alkyl (e.g., $C_{1-6}$alkyl), alkoxyalkyl (e.g., —$C_{1-4}$alkylene-O—$C_{1-4}$alkyl), or carboxyalkyl (e.g., —$C_{1-4}$alkylene-$CO_2$H); or $R^a$ and $R^b$ taken together with the carbon to which they attach form a cycloalkyl (e.g., $C_{5-7}$cycloalkyl). Suitable radical initiators include 2,2'-Azobis(4-methoxy-2,4-dimethylvaleronitrile), 2,2'-Azobis(2,4-dimethylvaleronitrile), 2,2'-Azobis(isobutyronitrile), 2,2'-Azobis(2-methylbutyronitrile), 1,1'-Azobis(cyclohexane-1-carbonitrile), 4,4'-Azobis(4-cyanovaleric acid), Dimethyl 2,2'-azobis(2-methylpropionate), 2,2'-Azobis(N-butyl-2-methylpropionamide), 2,2'-Azobis[2-methyl-N-(2-hydroxyethyl)propionamide], 2,2'-Azobis[2-(2-imidazolin-2-yl)propane]dihydrochloride, 2,2-'Azobis[2-(2-imidazolin-2-yl)propane], 2,2'-Azobis[N-(2-carboxyethyl)-2-methylpropionamidine], and 2,2'-Azobis(2-methylpropionamidine)dihydrochloride.

The g-Def-PVDF may be reacted with an epoxy resin to form a ternary polymer composition comprising:
(i) a fluoropolymer comprising a polyethylene backbone optionally containing one or more double bonds, the polyethylene backbone being substituted with a plurality of fluoro groups and optionally a plurality of oxygen atoms;
(ii) a plurality of fluoroalkyl(poly)propionyl groups grafted to the polyethylene backbone; and
(iii) one or more epoxy resin moieties linked to the polyethylene backbone through an oxygen atom.

In some embodiments, the coating composition comprises a copolymer that is a reaction product of: (i) a functionalized epoxy resin (EP); (ii) a hydrophobic ligand; and (iii) a modified polyvinylidene fluoride polymer (m-PVDF) having the following repeating unit:

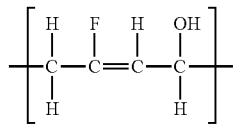

wherein the weight average molecular weight of the m-PVDF is about 50,000 to about 1,000,000 Da; wherein the epoxy resin is attached to the m-PVDF via a dehydration reaction with the —OH group of the m-PVDF; and the hydrophobic ligand is attached to the m-PVDF via a reaction with the alkene group.

The epoxy resin moiety may be derived from a corresponding starting glycidyl end-capped poly(bisphenol A-co-epichlorohydrin) of formula (I), such as formula (I-a).

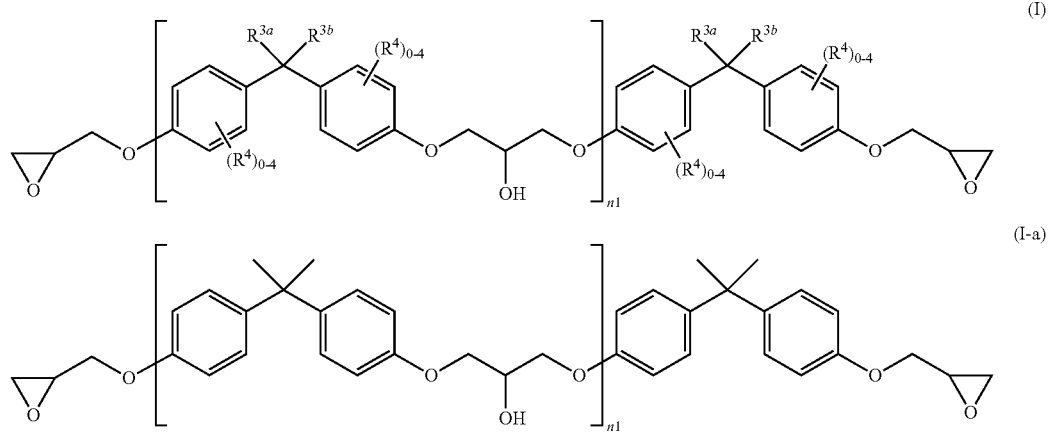

wherein $R^{3a}$ and $R^{3b}$, at each occurrence, are independently hydrogen, $C_{1-4}$alkyl, $C_{1-4}$haloalkyl, $C_{3-6}$cycloalkyl, or $C_{1-3}$alkylene-$C_{3-6}$cycloalkyl, or independently $R^{3a}$ and $R^{3b}$ together with the carbon atom to which they attach form a $C_{3-6}$cycloalkyl, wherein each $C_{3-6}$cycloalkyl is optionally substituted with 1-4 substituents independently selected from the group consisting of halogen, $C_{1-4}$alkyl, and $C_{1-4}$haloalkyl; $R^4$, at each occurrence, is independently halogen, cyano, $C_{1-4}$alkyl, or $C_{1-4}$haloalkyl; and n1 is 0-5.

Reactants of formula (I)/(I-a) may be in the form of mixtures containing varying proportions of n1=0, n1=1, etc. that are defined by an average molecular weight. For formula (I-a), if n=0, 1, 2, 3, or 4, the molecular weights are, respectively, 340, 624, 908, 1192, or 1476. In a low molecular weight epoxy resin with a mean molecular weight of 380, the distribution may be approximately 88% n1=0, 10% n1=1, and 2% n1=2.

Reaction of g-Def-PVDF with an epoxy of formula (I) or (Ia) may occur at a carbon atom on the epoxy substituted with an alcohol or epoxide oxygen to cross-link with the g-Def-PVDF, representative examples of which are shown in formulas (II), (II-a), (III), (III-a), (IV), and (IV-a). The crosslinking reaction may be conducted in an organic solvent (e.g., DMF) at elevated temperature such as 60-100° C. (e.g., 80° C.) for sufficient time to effect cross-linking (e.g., 12 hours) and may be conducted in the presence of acid or base catalysis.

The epoxy resin moiety may have a number average molecular weight of about 350 to about 1500. The epoxy resin moiety may be bisphenol A based, such as formulas (II), (II-a), (III), (III-a), (IV), and (IV-a), which are glycidyl ether derivatives of a bisphenol A based core structure. The epoxy resin moiety may have formula (II)

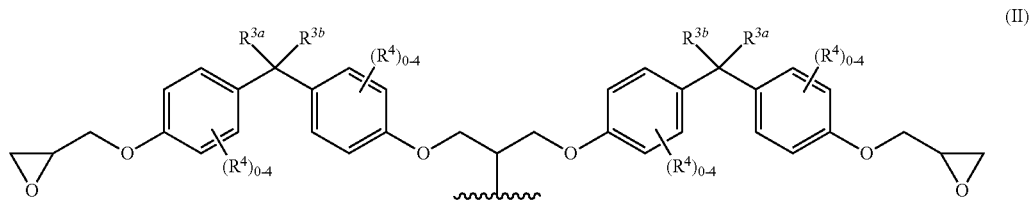

(II)

wherein $R^{3a}$ and $R^{3b}$, at each occurrence, are independently hydrogen, $C_{1-4}$alkyl, $C_{1-4}$haloalkyl, $C_{3-6}$cycloalkyl, or $C_{1}$-alkylene-$C_{3-6}$cycloalkyl, or independently $R^{3a}$ and $R^{3b}$ together with the carbon atom to which they attach form a $C_{3-6}$cycloalkyl, wherein each $C_{3-6}$-cycloalkyl is optionally substituted with 1-4 substituents independently selected from the group consisting of halogen, $C_{1-4}$alkyl, and $C_{1-4}$haloalkyl; and $R^4$, at each occurrence, is independently halogen, cyano, $C_{1-4}$alkyl, or $C_{1-4}$haloalkyl. The epoxy resin moiety may have formula (II-a).

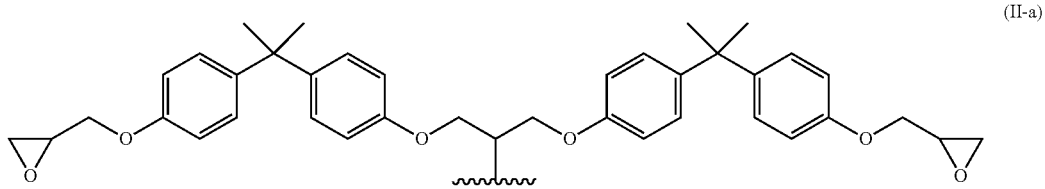 [SMILES: *C(COc1ccc(C(C)(C)c2ccc(OCC3CO3)cc2)cc1)COc1ccc(C(C)(C)c2ccc(OCC3CO3)cc2)cc1]

(II-a)

The epoxy resin moiety may have formula (III)

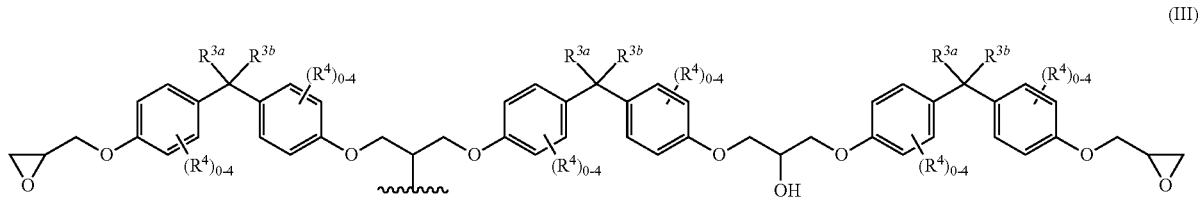

(III)

wherein $R^{3a}$ and $R^{3b}$, at each occurrence, are independently hydrogen, $C_{1-4}$alkyl, $C_{1-4}$haloalkyl, $C_{3-6}$cycloalkyl, or $C_{1-3}$alkylene-$C_{3-6}$cycloalkyl, or independently $R^{3a}$ and $R^{3b}$ together with the carbon atom to which they attach form a $C_{3-6}$-cycloalkyl, wherein each $C_{3-6}$cycloalkyl is optionally substituted with 1-4 substituents independently selected from the group consisting of halogen, $C_{1-4}$alkyl, and $C_{1-4}$haloalkyl; and $R^4$, at each occurrence, is independently halogen, cano, $C_{1-4}$alkyl, or $C_{1-4}$haloalkyl. The epoxy resin moiety may have formula (III-a).

The choice of particle can also impart additional properties to the coating such as preventing discoloration (usually yellowing) of the coating (titanium oxides), anti-corrosive (zinc oxides) or anti-bacterial properties (e.g., aluminum oxides, silver).

In some embodiments, the particles are 0-dimensional nano-/micro-particles or 1-dimensional nano-/micro-rods. In some embodiments, the coating composition comprises a pluarility of particles having an average diameter of <1000 μm. In a preferred embodiment, the particle is activated

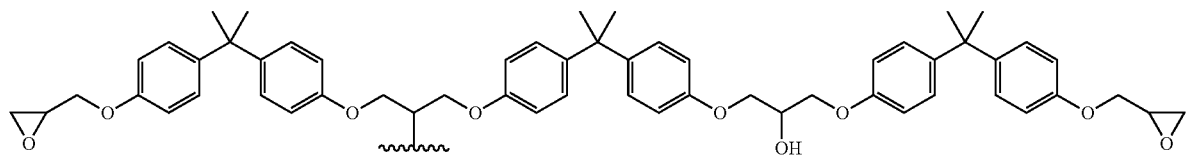

(III-a)

The epoxy resin moiety may have formula (IV)

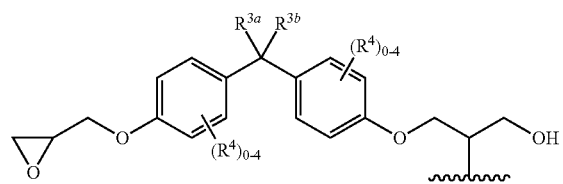

(IV)

wherein $R^{3a}$ and $R^{3b}$, at each occurrence, are independently hydrogen, $C_{1-4}$alkyl, $C_{1-4}$haloalkyl, $C_{3-6}$cycloalkyl, or $C_{1-3}$alkylene-$C_{3-6}$cycloalkyl, or independently $R^{3a}$ and $R^{3b}$ together with the carbon atom to which they attach form a $C_{3-6}$cycloalkyl, wherein each $C_{3-6}$cycloalkyl is optionally substituted with 1-4 substituents independently selected from the group consisting of halogen, $C_{1-4}$alkyl, and $C_{1-4}$haloalkyl; and $R^4$, at each occurrence, is independently halogen, cyano, $C_{1-4}$alkyl, or $C_{1-4}$haloalkyl. The epoxy resin moiety may have formula (IV-a), wherein R3a, R3b, and $R^4$ are as defined herein.

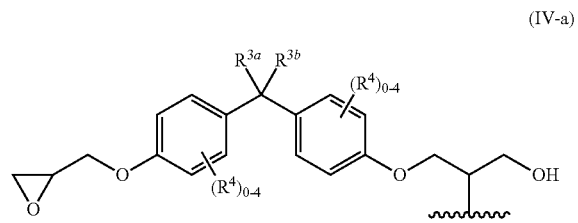

(IV-a)

The epoxy resin moiety provides the coating composition with epoxide groups that may react with curing agents such as 5-amino-1,3,3-trimethylcyclohexanemethylamine.

The coating composition further includes a fluoroalkyl-modified particle, wherein the particle includes activated carbon, other types of carbon, ceramic oxides, metal oxides, metal carbonates, metal nitrides and any combination thereof. Suitable elements include, but not limited to, those of Si, Al, Ag, Fe, Mg, Ca, Cu, Cr, Ti, Zn, among others and mixed-metal oxides/carbonates/nitrides of these elements.

carbon. In another preferred embodiment, the particle is a silicon dioxide or silica ($SiO_2$).

The fluoroalkyl modification may take the form of a fluoroalkylcarboxylic acid (e.g., perfluoroalkylcarboxylic acid) reacted with the particle. The reaction may be an adsorption, chemisorption, or the perfluoroalkylcarboxylic acid may associate with the particle through Van der Waals forces. The perfluoroalkylcarboxylic acid may be a $C_{5-15}$perfluoroalkylcarboxylic acid, such as perfluorodecanoic acid ($CF_3(CF_2)_8COOH$). The perfluoroalkylcarboxylic acid and particle may be reacted in a weight ratio, respectively, of 1 to about 12-22, 1 to about 14-20, 1 to about 16-18, or 1 to about 17.

The fluoroalkyl-modified particle may be mixed with the ternary composition described herein to form a coating composition of the invention.

In another embodiment, oxide particles such as $SiO_2$ particles replace activated carbon as particle choice in the 3D hybrid composite coating. In another embodiment, the oxide particles are >10 nm in diameter. Advantageously, perfluorodecanoic acid-encapsulated silica nanoparticles may be used in the above synthesis to generate a clear version (transparent) of the 3D hybrid composite coating.

Alternatively, the Def-PVDF, fluoroalkylacrylate, radical initiator, epoxy resin, and fluoroalkyl-modified particle may be reacted together in one pot to directly prepare the coating composition according to the invention. Accordingly, an aspect of the invention provides a coating composition prepared by a reaction of dehydrofluorinated PVDF, a fluoroalkylacrylate, a radical initiator, an epoxy resin, and a fluoroalkyl-modified particle, wherein the dehydrofluorinated PVDF, fluoroalkylacrylate, radical initiator, epoxy resin, and fluoroalkyl-modified particle are as described herein. The reaction may be conducted in an organic solvent (e.g., DMF) at elevated temperature such as 60-100° C. (e.g., 80° ° C.) for sufficient time to effect formation of the coating composition.

In another embodiment, the disclosure is a coating having hydrophobic qualities (i.e. having a contact angle of >90°). In another embodiment, the disclosure is a superhydrophobic coating, (i.e having a coating having a contact angle of ≥150°). In another embodiment, the disclosure is a hydrophobic coating (i.e having a coating having a contact angle of ≥120°) comprising particles arranged to create a heteroarchitecture and papillae. This coating has a contact angle that is reduced by 10-20° in contrast to the coating comprising same particles but functionalized or otherwise coated with hydrophobic ligands/groups.

In another embodiment, the 3D hybrid composite coating can be employed as a bubble release surface on metal, polymer and other solid surfaces, (i.e in sensors).

In another embodiment, the disclosure is mechanically robust, retaining its hydrophilic, hydrophobic or superhydrophobic and/or bubble release properties after mechanical testing.

In another embodiment, the 3D hybrid composite coating can be coated by a variety of means including, immersion (dip) coating, spray coating, gravure coating, using a metering (Mayer) rod, knife over roll coating, slot orifice coating and curtain coating.

In another embodiment, the 3D hybrid composite coating can be coated onto a variety of substrates including plastic, glass, metal, paper, ceramic, among other solid substrates.

3. EXAMPLES

Materials:

Heptadecafluorodecyl acrylate (HDFAA), 12 wt % azobisisobutyronitrile (AIBN) in acetone, sodium hydroxide, perfluorodecanoic acid (PFDA), N,N-dimethylformamide (DMF), poly(bisphenol a co-epichlorohydrin) glycidyl end-capped (Mn: ~350-400) as an epoxy resin, 15 nm silicon dioxide ($SiO_2$, spherical, porous), and 5-amino-1,3,3-trimethylcyclohexane methyl-amine, mixture of cis & trans (99%) as a curing agent, were purchased from Sigma-Aldrich. Poly(vinylidene fluoride) (PVDF), anhydrous ethanol (94-96%), and activated carbon powder (norit GSX, steam activated acid washed) were purchased from Alfa Aesar. All the chemicals were used without further purifications. The double distilled water was used throughout whole experiments.

Example 1. Synthesis of the 3D Hybrid Composite

A 3D hybrid composite was synthesized through a series of functionalizations of the both ACs and EP. The $CF_3$ groups were first generated on the AC surface (f-AC) and on $SiO_2$ surface (f-$SiO_2$) using PFDA. In a typical experiment, 5 g AC powder was dispersed in 150 mL DMF solution under a magnetic stirring for 10 min. Next, 0.3 g PFDA was added into the solution and was then refluxed at 120° C. for 12 hours using a glass reflux system. Next, the mixture solution was filtered through a 0.2 µm PVDF membrane filter in a vacuum filtration system. Then it was rinsed at least 3 times with ethanol to remove excess chemical residuals. Afterwards, the sample was peeled off and was dried at 80° C. in an oven for 5 hours at atmospheric pressure. For the functionalization of EP, 2 g PVDF powder was added into 40 mL alkaline solution (5 wt % NaOH) under magnetic stirring for 12 hours at room temperature. After filtration and drying, a modified PVDF powder (m-PVDF) was obtained. Subsequently 0.65 g m-PVDF and 2 g EP were mixed in 10 mL DMF solution. In parallel, 0.6 g HDFAA, 0.016 g AIBN and 0.52 g f-ACs were added into the solution under stirring in an oil bath at 80° C. for 12 hours. As a result, the composite was formed by a one-pot chemical method that includes simultaneous reactions of condensation and free radical polymerization. The obtained self-cleaning composite solution is ready to be coated on versatile substrates using aforementioned methods along with a 180° C. heating process for 5 hours or air dry for 24 hours. The 3D hybrid composite was also synthesized as function of f-$SiO_2$ amount through same procedure. Amount of f-$SiO_2$ was controlled of total composite (13, 19, 23.8, 27.4, 31, 44.8, 52.4, 59.3 and 64 wt %).

Sample Characterization.

The surface morphology of the coating was checked on a Hitachi S4800 ultra-high resolution field emission scanning electron microscope (FESEM) equipped with energy-dispersive X-ray spectroscopy (EDX). The X-ray photoelectron spectroscopy (XPS) was conducted using Thermo Scientific ESCALAB 250Xi which is equipped with an electron flood gun and a scanning ion gun. Diffuse Fourier-transform infrared spectroscopy (FTIR) was recorded on a Nicolet 6700 Series FTIR spectrometer (Thermo Fisher Scientific, Inc., Madison, Wis.). Optical grade, random cuttings of KBr powder (International Crystal Laboratories, Garfield, N.J.) with 1.0 wt. % of the sample was grounded, packed firmly and leveled off at the upper edge to provide a smooth surface. The FTIR sample chamber was flushed continuously with $N_2$ prior to data acquisition in the range of 4000-400 $cm^{-1}$ with an offset of 4 $cm^1$. A 3D laser confocal microscopy (Olympus LEXT OLS4100, Japan) was used to collect the surface roughness information. The sample was coated on a glass slide and was then checked under a cutoff wavelength of λc=8 µm, field depth of 257 µm and a Gaussian filter. The contact angle was measured using a Dataphysics OCA 15 Optical Contact Angle Measuring System, with a dropwise volume from 3-10 µL and the speed of injection from 1 mL/min to 5 mL/min.

The functional groups such as fluorine, alkane and siloxane on a hierarchical architecture can lower down the surface energy and trap more air underneath, thereby keeping a spherical shape of water droplet perpendicularly standing. In the approach described here, an intermediate mediator, m-PVDF, was employed as a bridge to connect the hydrophobic groups from EP and another HDFAA using a facile 'grafting' method (FIG. 1). As a result, the mechanics can be imparted by the EP and hydrophobicity can be imparted by the grafted HDFAA via a newly formed copolymer, f-EP. The neighboring hydrogen and fluoride atoms from vinylidenefluoride of PVDF may be susceptible to form hydrogen fluoride in an alkaline condition (pH>14.0). This dehydrofluorination may generate a C=C bond, as evidenced by a new C1s peak at 284.5 eV from the XPS spectra (FIG. 2 (I), m-PVDF). The nucleophilic substitution of low-activity F with high-activity hydroxyl groups may be promoted by electron withdrawing inductive effects, forming OH groups (FIG. 1 (I)). As can be seen from the XPS spectra, two strong C1s peaks located at 286.4 and 291.0 eV represented the presence of abundant $CH/CH_2$ and $CF_2$ groups in both PVDF and m-PVDF (FIG. 2 (I)). In the following step, the strong hydrophobic-hydrophobic interaction between m-PVDF and HDFAA may lead to a free radical generation by breaking the C=C bond via an initiator AIBN. Subsequently the HDFAA may be connected to the m-PVDF after a series of free-radical polymerizations (FIG. 1 (II)). Next, the HDFAA may be grafted onto the EP via m-PVDF as a bridge by dehydration (FIG. 1 (III)). Thus, a strong connection between the cross-linking m-PVDF and EP may occur through a C—O—C covalent bonding induced by intermolecular dehydration condensation of hydroxyl groups under high temperatures, forming a new copolymer f-EP (FIG. 1 (III)). This strong covalent bond may further strengthen the whole skeleton.

Figure 8A:
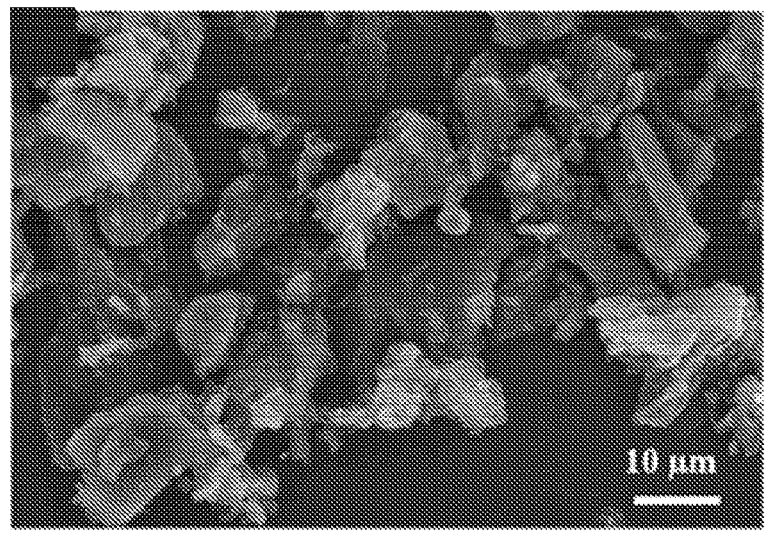
FIG. 8A shows the SEM image of the original ACs.

Another benefit of m-PVDF is its amphiphilicity which may be due to the existing carbon fluoride groups (hydrophobicity) and hydroxy groups (hydrophilicity). In order to further improve the hydrophobicity, a hierarchical configuration needed to be created, which contained a micro-/nano-roughness as well as low-energy functional groups with a similarity to lotus leaf. This hetero-architecture was conducted through a rational design of AC particles (FIG. 1 (IV)). The ACs with varying primary sizes ranging from several to tens of micrometers and secondary sizes ranging from tens to hundreds of nanometers provided a hierarchical geometry with a mean surface roughness of 15 μm (FIGS. 8A and 9B). The original ACs were modified with PFDA through a condensation of COOH and OH groups (FIG. 1 (IV)).

Figure 2:
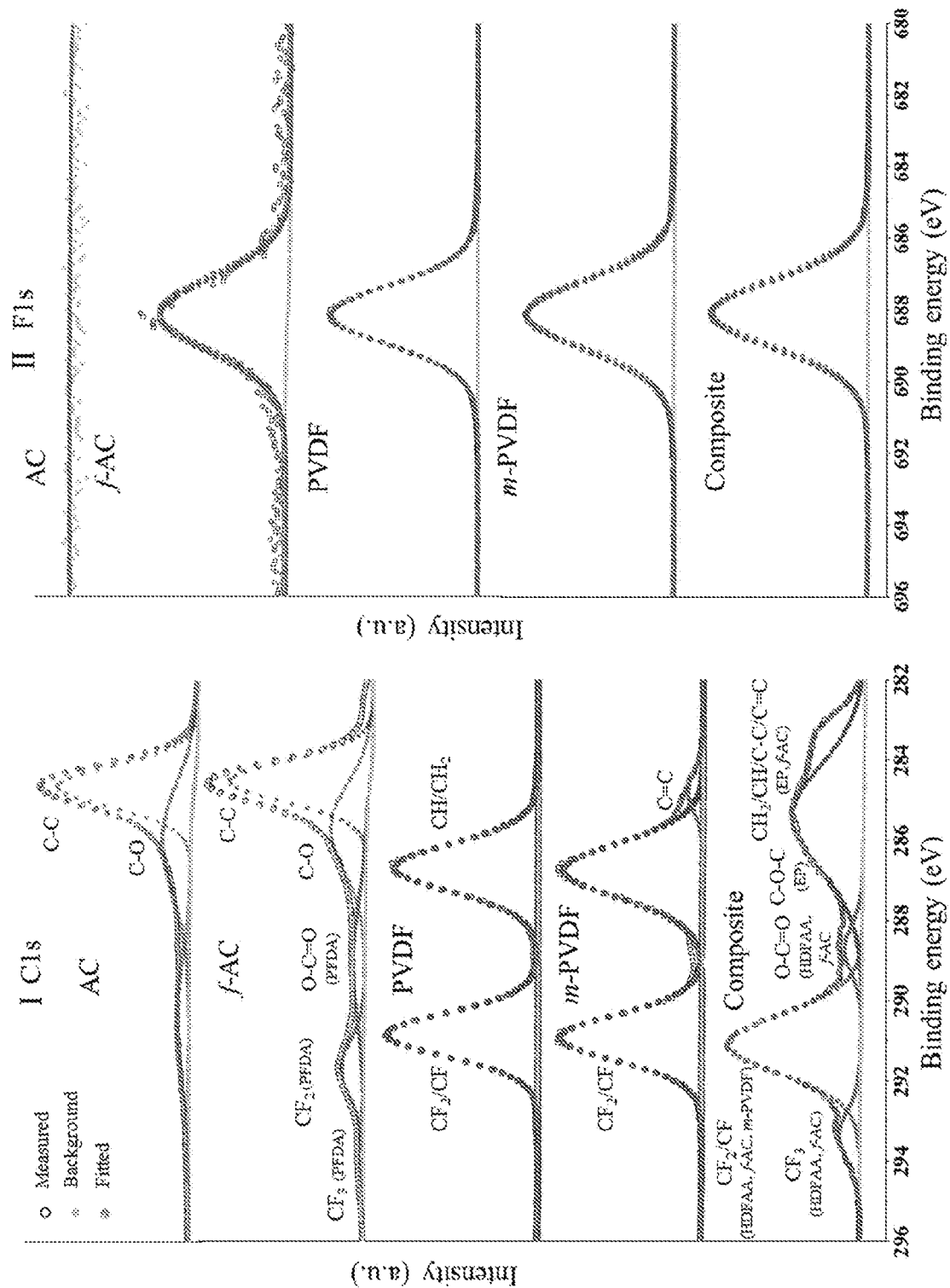
FIG. 2 shows the binding energy evolution of forming a hybrid composite. High-resolution XPS spectra of (I) C1s and (II) F1s peaks of the AC, f-AC, PVDF, m-PVDF, and the final composite, respectively.
Figure 8B:
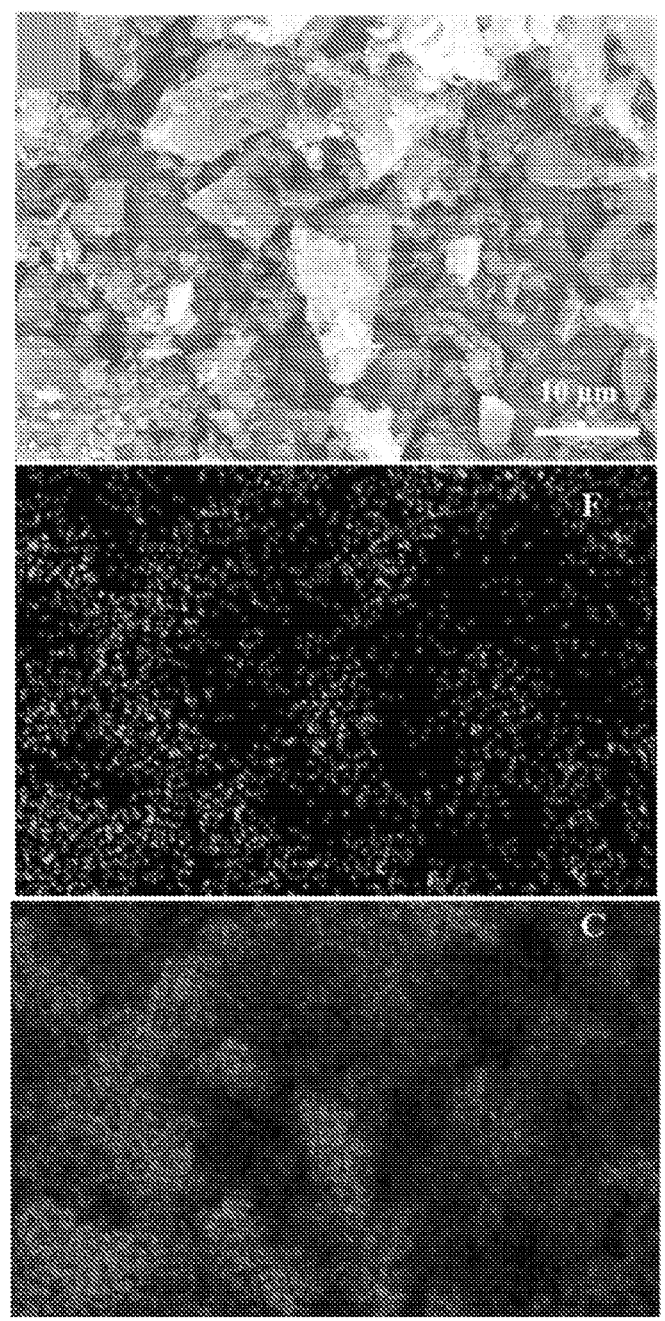
FIG. 8B shows the SEM image of the f-ACs and C and F elemental mappings of f-ACs using EDX.

The XPS results showed new peaks off-AC at 688.2, 291.6 and 293.3 eV, which correspond to F (F1s), $CF_2$ (C1s) and $CF_3$ (C1s) groups from PFDA, respectively (FIG. 2). The EDX mapping data showed the existing F element in the f-AC (FIG. 8B). The affiliated fluorine ligands on f-ACs demonstrated a water-repelling property as same as the groups in HDFAA (FIG. 1 (IV)). In the final step, f-EP and f-ACs may form a close-packed network through strong reciprocal hydrophobic-hydrophobic interactions (FIG. 1 (V)), which was indicated by the enhanced C1s ($CF_3$) peak at 293.3 eV and O—C=O peak at 288.6 eV from both HDFAA and PFDA in the final composite (FIG. 2 (I), composite) as well as the strong peak of F1s at 688.2 eV (FIG. 2 (II)). In addition, the two C1s peaks at 285.3 and 286.8 eV of the composite may be ascribed to the $CH_3$—C—$CH_3$ and C—O—C bonds in EP. The broadening peak of C=C was believed to be due to the plenty of phenyl groups in EP. Owing to the wide availability of precursors and the simple approach, the yield of the hybrid composite can reach kilograms scale, enabling broad industrial applications.

Figure 9A:
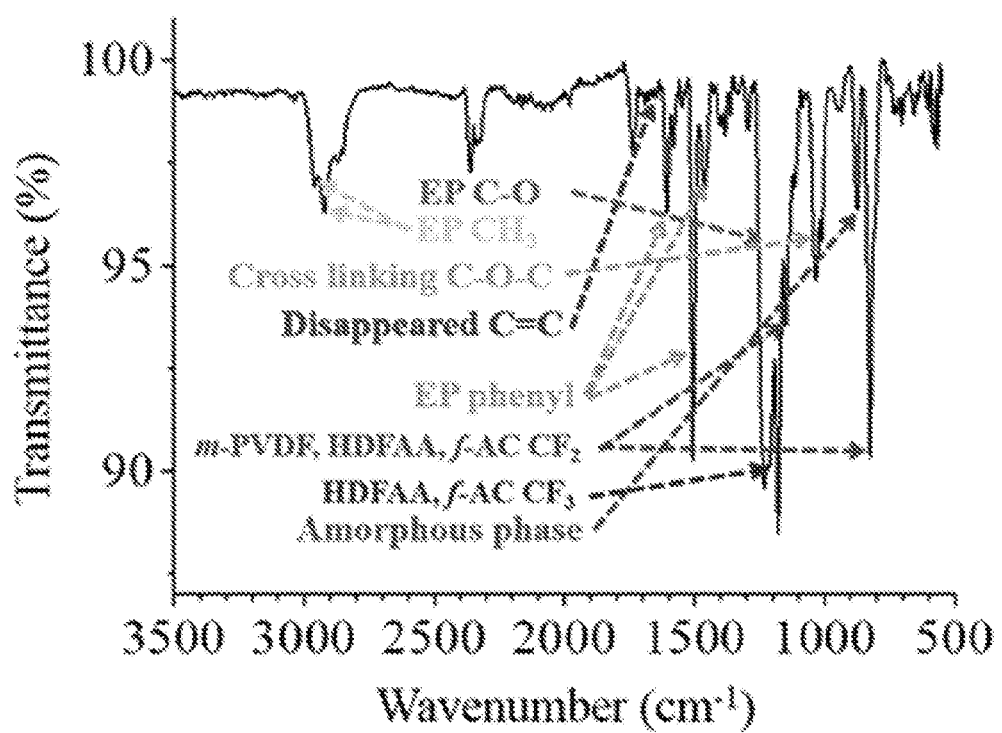
FIG. 9A shows the FTIR spectrum of the 3D hybrid composite.
Figure 9B:
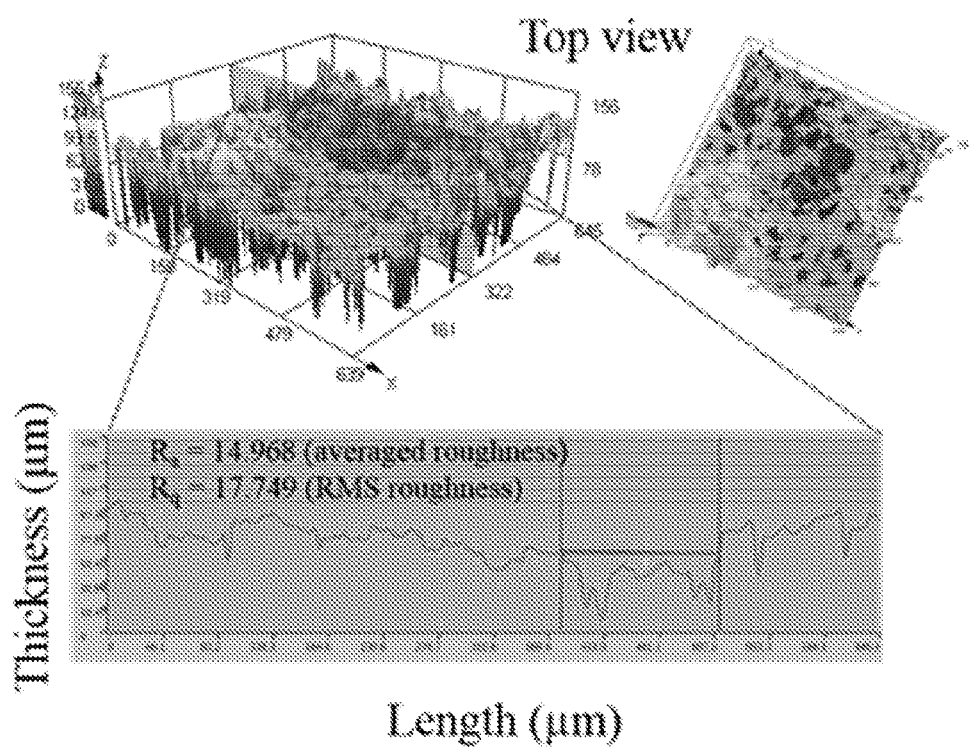
FIG. 9B shows the 3D laser micro-confocal microscopy image of the hybrid composite self-cleaning coating with surface profile.

The functional groups were further confirmed by FTIR measurements (FIG. 9A). The C=C bond from m-PVDF at 1633 $cm^{-1}$ which was generated from the dehydrofluorination of PVDF (FIG. 1 (I)) disappeared after grafting HDFAA on f-ACs. The peak at 1244 $cm^{-1}$ appeared in the resultant coating due to the aromatic ether bond stretching vibration of C—O of EP. Also, a strong peak of symmetric $CF_3$ stretching vibrations from f-AC and HDFAA were in the ranges 1226 $cm^{-1}$. The characteristic absorptions of bisphenol A appeared at 2964 $cm^{-1}$ and 2869 $cm^{-1}$ in the C—H stretching region from $CH_3$—C—$CH_3$ of EP, respectively. The strong absorption bands from phenyl of EP were seen at 1608, 1512 and 1455 $cm^{-1}$ which indicated a high hardness and a high corrosive resistance.

Figure 3A:
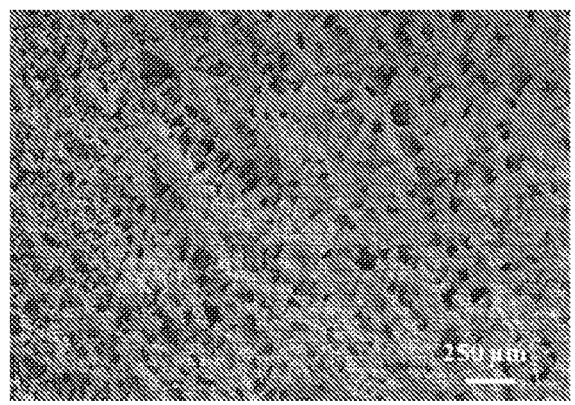
FIGS. 3A-3F show the SEM morphology of the composite on paper towels.
Figure 3B:
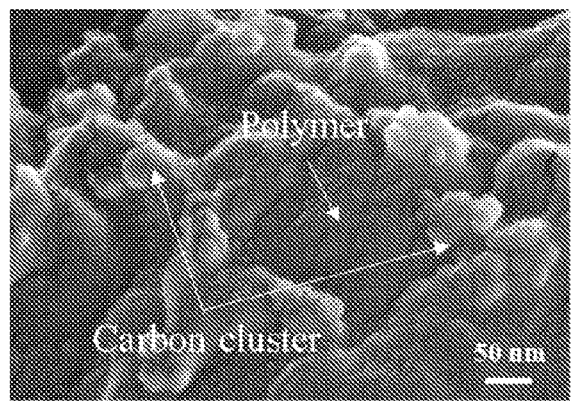
Figure 3C:
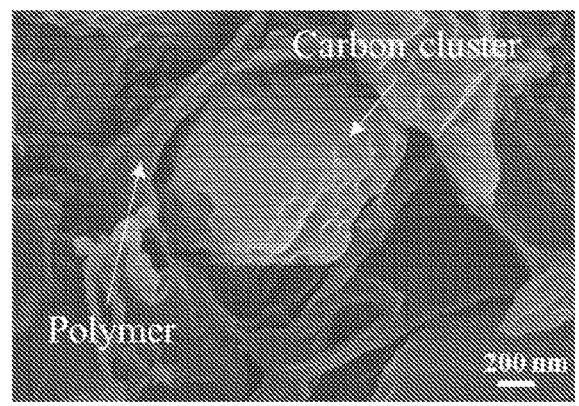
Figure 3D:
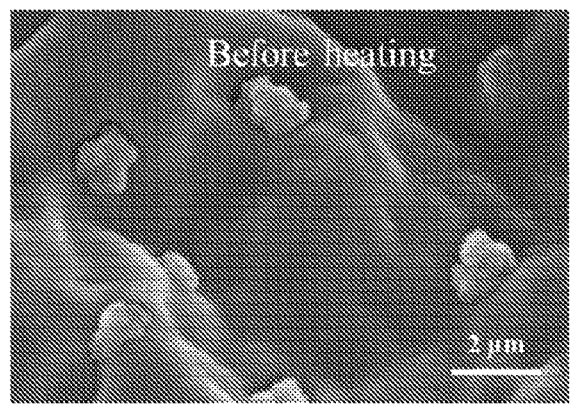
Figure 3E:
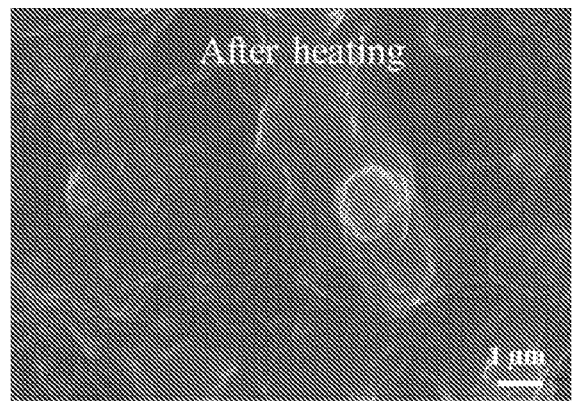
Figure 3F:

The EDX mapping showed the composite contained a large ratio of fluorine (FIG. 3F). The intensified peaks at 1157 and 874 $cm^{-1}$ confirmed the strong stretching vibrations of $CF_2$ and the amorphous phase of the m-PVDF that correspond to m-PVDF, HDFAA and f-ACs in the composite. A band at 1050 $cm^{-1}$, correlating to formed C—O—C group, evidenced the cross-linking reaction through the dehydration of m-PVDF and EP, as illustrated in FIG. 1 (III). In general, the fluorine groups on a hierarchical structure delivered a strong water-proof property because they reduced the interface energy between water and the trapped air pocket, while the phenyl group in EP correlated to a high hardness/rigidity and a high temperature tolerance. In addition, the existing active C—O—C groups in f-EP enabled a strong adhesion to substrates along with a high chemical resistance (anti-corrosion). Thus, the functional groups on the hierarchical architecture lowered the surface energy while providing high mechanical/chemical stability, resulting in a strong superhydrophobicity.

Morphology of the hybrid composite coating on glass was checked by SEM. FIGS. 3A-3B depict a hybrid hierarchical structure with a micro-/nano-roughness that comprises the f-ACs as skeleton and the f-EP as joining, which reinforced the composite with an apparently raised mechanical strength at failure. As observed from the enlarged cross-section (FIG. 3C), the f-ACs were rigorously encapsulated by the f-EP, forming an intersecting network. The morphology evolution of the composite framework on paper towels before and after curing was recorded in FIGS. 3D-3E. The individual carbon clusters with visible boundaries were uniformly distributed among the polymer matrix (FIG. 3D). Nonetheless, these clusters were completely embedded into the f-EP matrix by condensation reaction during the curing process, forming a compacted hybrid composite (FIG. 3E).

According to the Cassie's theory, superhydrophobicity can not be achieved by constructing a simple secondary papillae structure while a hierarchical architecture is needed instead. A droplet rests on top of the rough surface on solid-air composite surfaces (Cassie-Baxter wetting regime), where the CA can be described by $$\cos \theta' = f \cos \theta - (1-f) \quad (1).$$

Figure 4A:
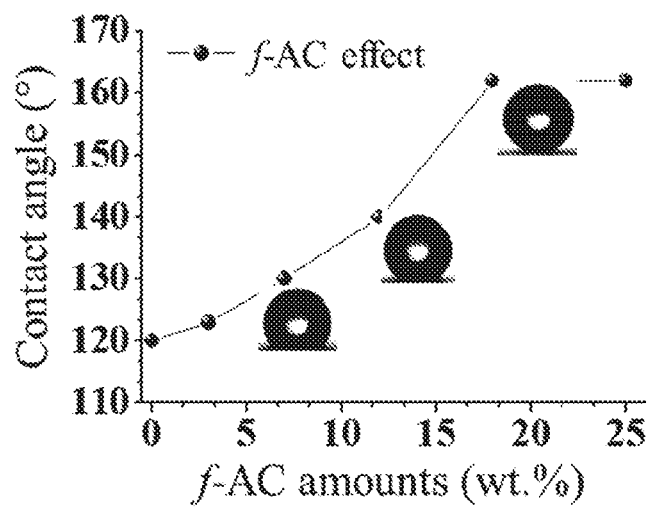
FIGS. 4A-4F show the different loadings off-ACs and HDFAA and the mechanical and chemical resistance of the coating compositions. The contact angle (CA) evolution as a function off-AC amounts (0-25 wt. %) is shown in FIG. 4A. The contact angle evolution as a function of HDFAA amounts (0-21.5 wt. %) is shown in FIG. 4B. A water droplet roll-off on a hybrid composite coated glass substrate with a tilt angle of 1 is shown in FIG. 4C. The contact angle evolution of the coating on glass after abrasion tests under 26.1 kP pressure is shown in FIG. 4D. The inset in FIG. 4D shows the method of abrasion test. Foldability and bendability tests results of the self-cleaning coating on paper towels are shown in FIG. 4E. The insets in FIG. 4E illustrate the morphology of testing samples. Chemical resistance tests of the self-cleaning coating under acid (pH=2), neutral (pH=7), and alkali (pH=9) conditions are shown in FIG. 4F. The contact angle error bar is ±1°.

Here, θ' and θ are the CAs on rough and flat surfaces with the same chemistry, respectively. The f(<1) is the fraction of solid/water interface and (1-f) is the fraction of air/water interface. A θ' of as high as 162° was measured with the hierarchical coating while a θ of 30° was obtained with bare glass substrate. Thus a very high (1-f) of 9.974 was calculated, which indicated an excellent superhydrophobicity. The micro-sized AC particles expressed a micro-roughness along with a nano-roughness formed by the existing small papillaes (FIGS. 8A and 9B). This hetero-architecture raised the air trapping opportunity reflected by the increasing factor (1-f). In other words, the water-solid contact area was drastically reduced and thus resulted in a higher CA. In parallel, the abundant $CF_3$— groups from PFDA and HDFAA further decreased the surface tension of water droplets. Thereby a synergistic interaction among the hierarchical f-ACs and f-EP greatly improved superhydrophobicity with a CA up to 162 (FIG. 4A).

Figure 4B:
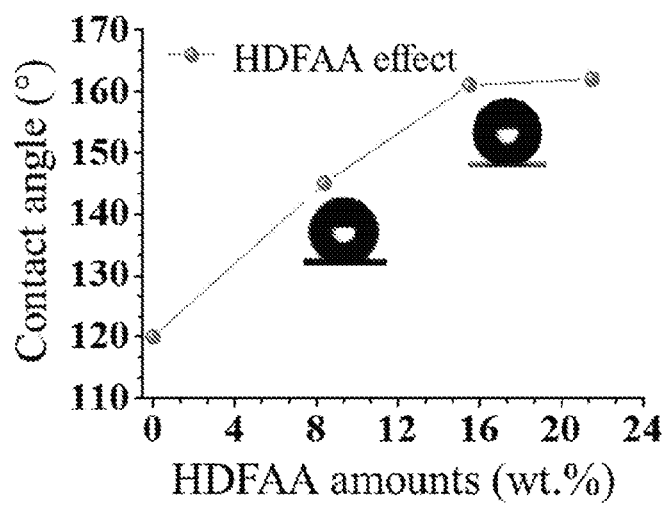
Figure 4C:
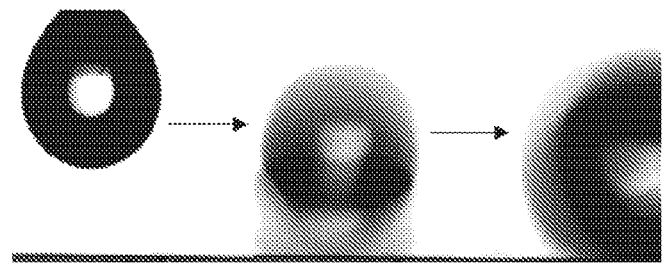

Since the hierarchical architecture with low energy groups is significant, different loadings off-ACs and HDFAA were investigated. As shown in FIG. 4A, the CA was increased from 120° to 162° when the f-ACs was changed from 0 to 18 wt. %. The CA was then stabilized at this point (~162°) with even more f-ACs due to aggravated agglomerations. A moderate loading of ~18 wt. % was finally selected. If the f-ACs concentration was fixed, the CA approached to the highest 162° upon a HDFAA loading of 21.5 wt. % (FIG. 4B). As a consequence, a mixture composite with 18 wt % f-ACs and 21.5 wt. % HDFAA provided a maximum air trap and a minimum surface energy, enabling an imposing superhydrophobicity. This outstanding superhydrophobic property was further verified by observing a droplet rolling on the coated surface with a tilt angle as small as 1° (FIG. 4C).

Example 2. Mechanical Resistance

Scratch resistance, Young's Modulus and hardness measurements of the 3D hybrid composite, commercial Loctite epoxy resin, and lab-made pure epoxy resin coated on slide glasses were measured using a Nano Indenter (Agilent Technologies, G200) with a Berkovich tip, a XP standard indentation at a depth of 3 μm, and a ramping load scratch from 0 to 500 mN, respectively. Peel adhesion was performed using Scotch Filament Tape 897 Clear under the ASTM Standard (D3359-09) of B-Cross-Cut Tape Test. Foldability and bendability of the 3D hybrid composite coated paper towels were also checked.

Abrasion test of the hybrid composite coating on glass substrate was done using sandpaper under a high pressure. Typically, a sandpaper with grit No. 400 was placed face-down to the coating. Then 5 kg standard weight was added on the top surface of sandpaper. According to the 18.75 cm$^2$ surface area of the coating on glass, the added pressure is 26.1 kpa. One abrasion cycle was defined as: the sample was moved forward for 10 cm, then rotated by 90° (face to the sandpaper) and moved backward for 10 cm along the same route.

Figure 4D:
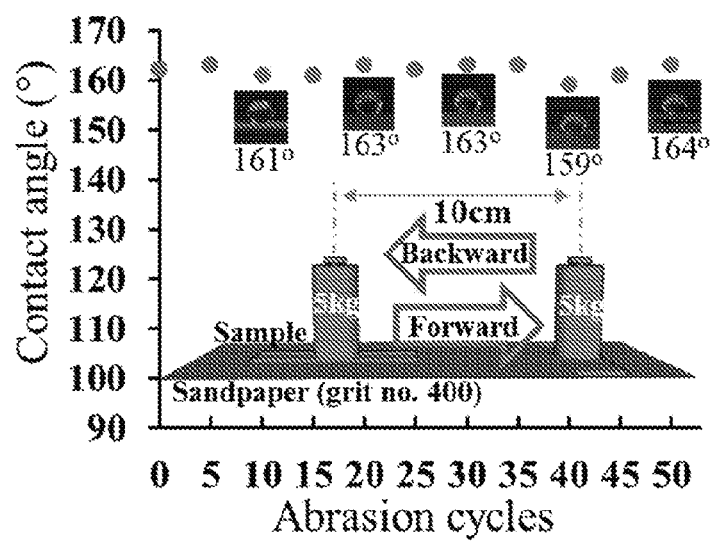
Figure 4E:
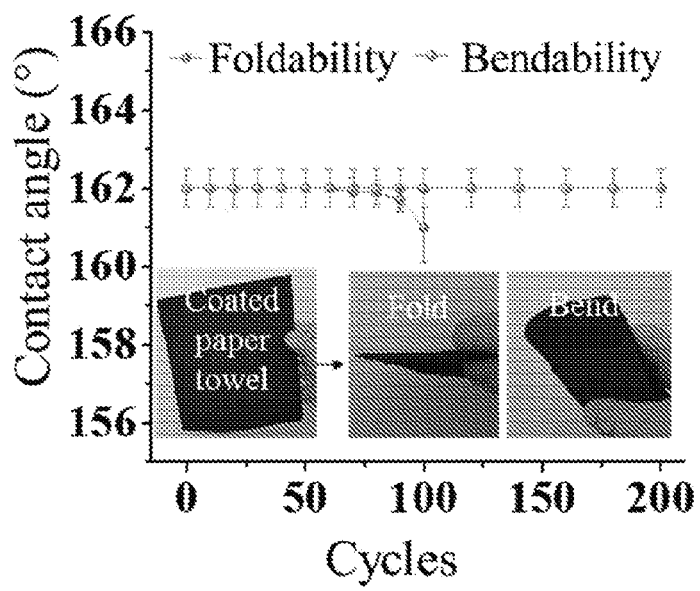

The abrasion test of the coating on glass under a high pressure of 26.1 kPa using sandpaper is shown in FIG. 4D. After strong abrasion, the coating still showed a stable average CA of over 160°. In particular, a high CA at ~164° was observed even after long 50 cycles. This remarkable superhydrophobicity under harsh abrasion demonstrated a greatly enhanced mechanical adhesion to the substrate, which enables the hybrid composite coating for use in a wide variety of applications especially in the fields of rigorous environments. Mechanical stability of the hybrid self-cleaning coating was also checked with bendability and foldability, respectively (FIG. 4E). A consistent CA of 1620 was obtained even after bending up to 100 times. A slightly decreased CA of 160.5° was still received after suffering 100 foldings.

Another important mechanical property was measured using a ramping load scratch method. As shown in FIG. 6, three ramping load scratches under a maximum force of 500 mN at a same strain rate were performed on the lab-made pure EP, the commercial epoxy resin Loctite, and the hybrid composite coating, respectively. In principle, a spallation failure occurs in polymers upon a ductile failure mode. The failure point can be identified via the morphology evolution of scratch line. For the lab-made epoxy, the average failure force was measured at 287 mN with a failure length of 776 μm while the commercial Loctite failed at 240 mN with a shorter failure length of 667 μm. As the comparison, the hybrid composite coating did not show a failure point until the test reached its upper limit. A minimal surface scratch was observed instead, indicating a rigid surface to withstand the applied external force. Hardness and Young's modulus of the samples were studied using a standard indentation. The hybrid composite coating delivered the largest modulus of 9.0 GPa and hardness of 0.17 GPa.

Example 3. Chemical Resistance

Figure 4F:
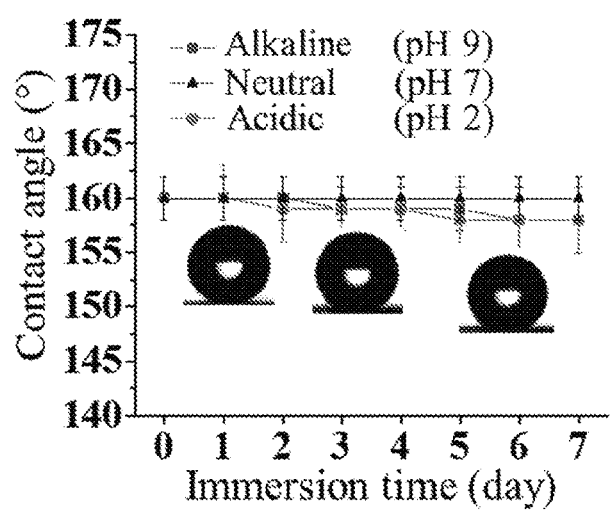

Chemical stability was analyzed through a series of pH tests by immersing the sample into a solution with pH ranging from 2 to 9, respectively. As can be seen from FIG. 4F, the CA of the coating after being immersed in solutions with a pH of 2, 7, and 9 for 7 days was almost stabilized at 160°, demonstrating an excellent tolerance to both acidic and alkaline environments. Without being bound by theory, this high chemical resistance may be due to the the ether group C—O—C in f-EP and the strong water repelling property.

Example 4. Transparent Self-Coating

Figure 5A:
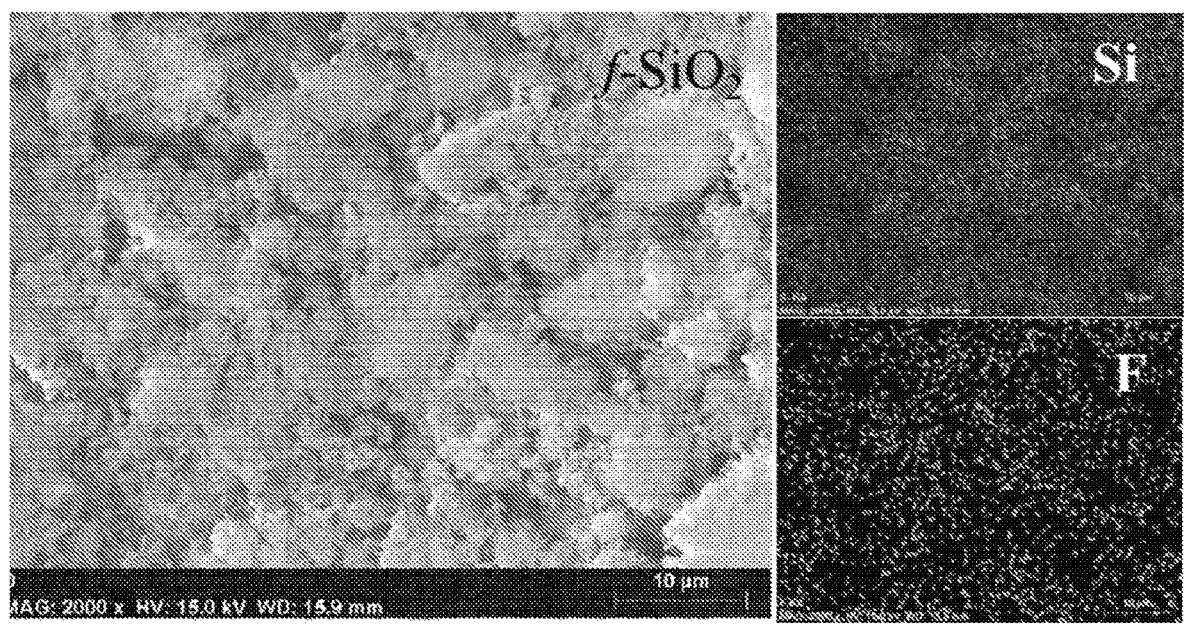
FIGS. 5A-5D show the morphology of the $SiO_2$ hybrid composite and contact angle/transparency vs coating thickness. The SEM morphology and the corresponding elemental mappings of Si and F are shown in FIG. 5A. The contact angle evolution with the decreasing thickness is shown in FIG. 5B. The contact angle evolution as a function of f-$SiO_2$ amounts (0-64.0 wt. %) is shown in FIG. 5C. The contact angle and transmittance vs coating thickness is shown in FIG. 5D. The contact angle error bar is ±1°.
Figure 5B:
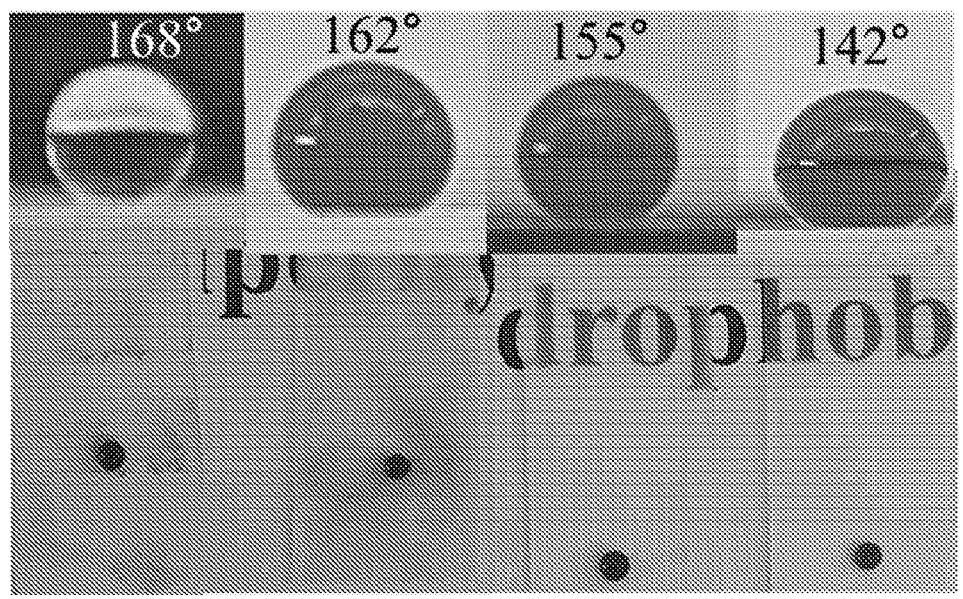
Figure 5C:
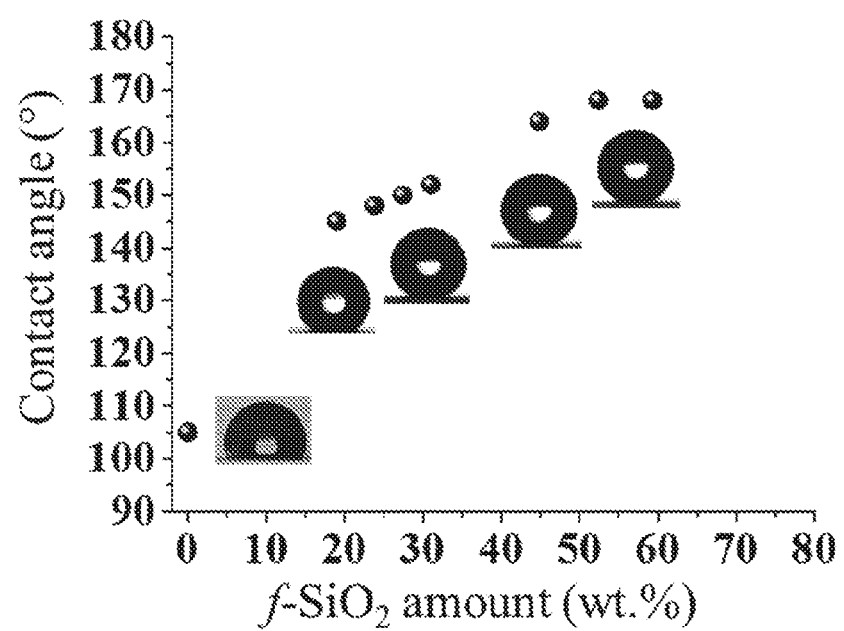
Figure 5D:
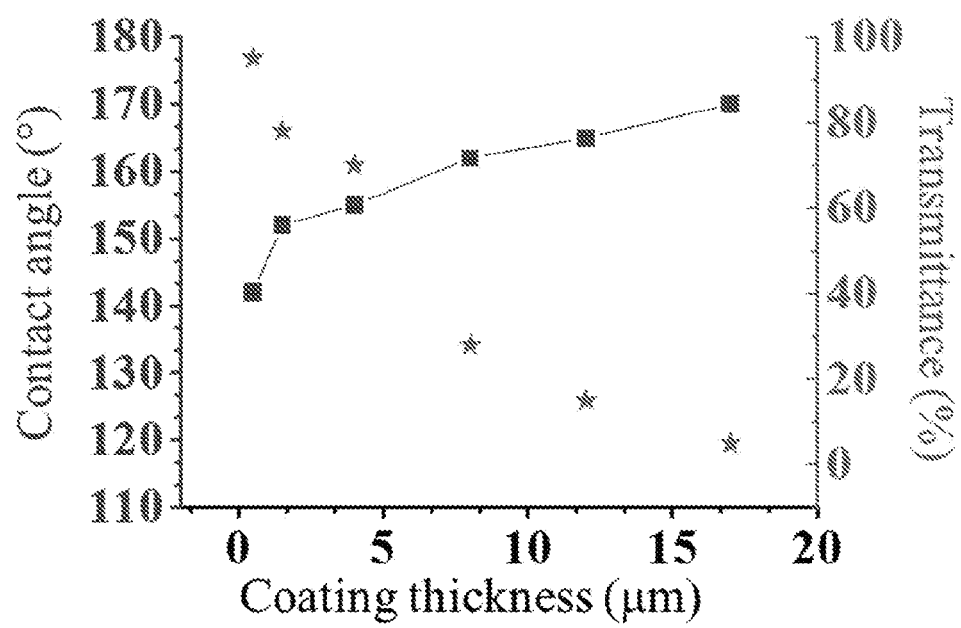
Figure 7:
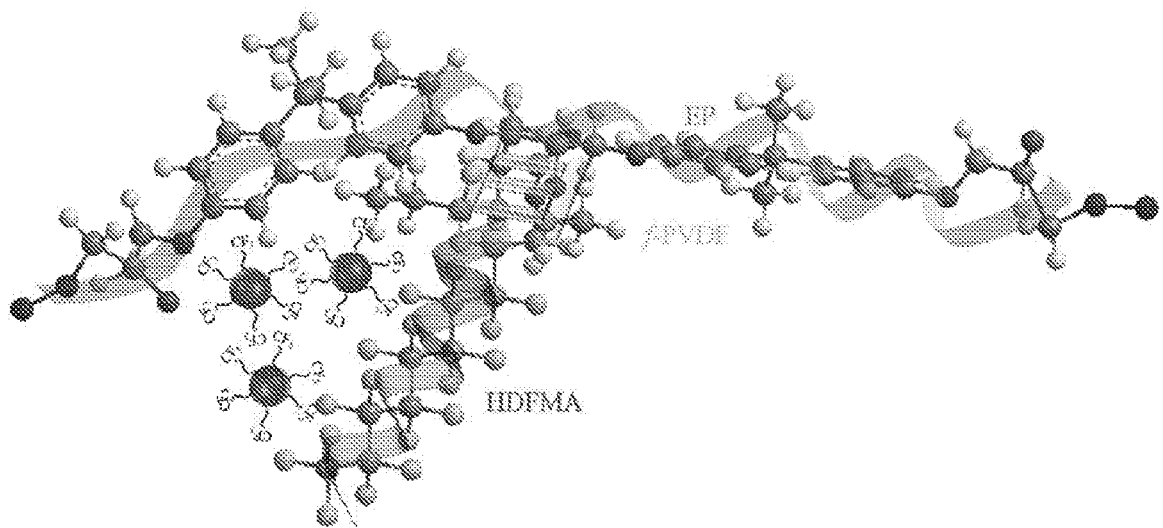
FIG. 7 shows a model of a proposed structure of a coating composition of the invention.

A transparent self-coating also has potential for more applications in broad fields. Silica particles were used as an alternate to form the hierarchical structure (FIG. 5A). As can be seen from FIG. 5C, the CA was increased from 105° to 168° with the increase of f-SiO$_2$ from 0% to 64%, which was similar to the f-AC in FIG. 4A. The coating with ~1.5 μm thickness shows a ~80% transmittance of visible light and a CA of ~153°. The CA increased when the thickness increased, while with a decrease of transparency (FIGS. 5B and 5D). The droplet roll-off on the coated glass at 1° tilt angle was recorded.

In summary, a hybrid composite self-cleaning coating was synthesized at large scales with an enhanced mechanical property via rational design of the hierarchical architecture. The superhydrophobic surface with varying transparency was created by the f-AC or f-SiO$_2$ incorporated with the f-EP via the critical n-PVDF as a bridge. The hydrophobic-hydrophobic interaction between the f-EP and f-ACs strengthened both mechanics and superhydrophobicity, which was confirmed by a high-pressure abrasion test. The hybrid composite formed a robust surface, which also showed a better anti-corrosion in comparison with commercial epoxy. As shown in the comparison FIG. 10, the use of industry available epoxy and particles as precursors along with the substantially extended lifetime, flexibility, and mass production indicate practical applications for this coating in the broad field of water-energy nexus such as self-clean windows, sensors, pipelines, etc.

Example 5. Bubble Creation and Bubble Adhesion

The effectiveness of the coatings to prevent bubble creation and/or bubble adhesion on the surface of the Temperature Ultrasonic Level and Concentration (TULC) sensors stainless steel reflector and 30% GF HDPE tombstone was investigated.

Bubble Nucleation.

TULC units were submerged in cold tap water. The water was then allowed to slowly come to room temperature, creating the formation of bubbles through nucleation. The sensors were monitored at 2, 4, 6, and 16 hours following initial submersions for evidence of coating dissolution such as color change of the surrounding water or visible particulates.

Figure 11A:
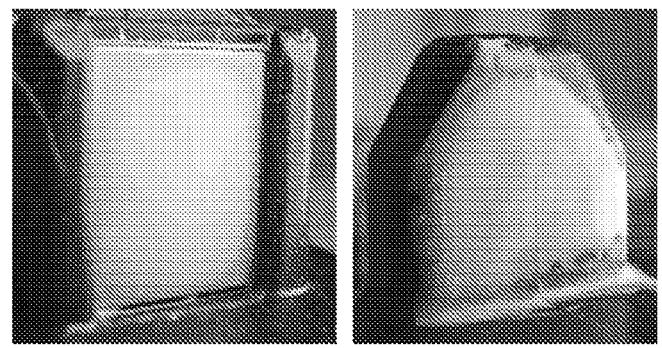
FIGS. 11A-11E are images of Sensor 7 during bubble nucleation analysis.
Figure 11B:
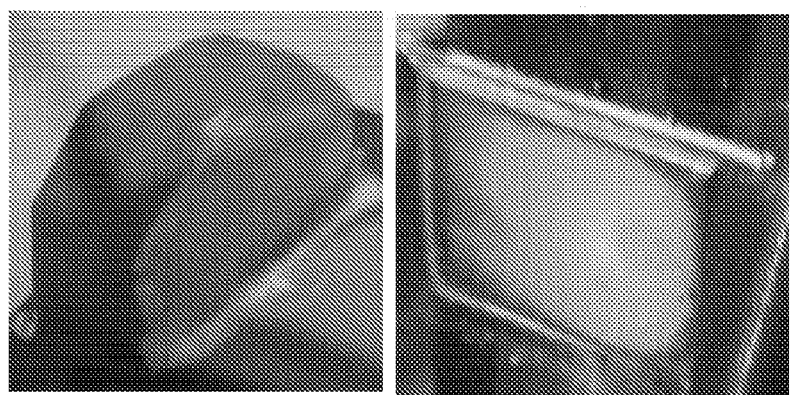
Figure 11C:
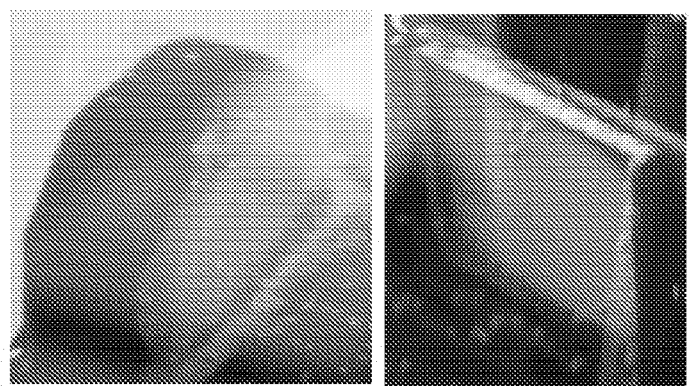
Figure 11D:
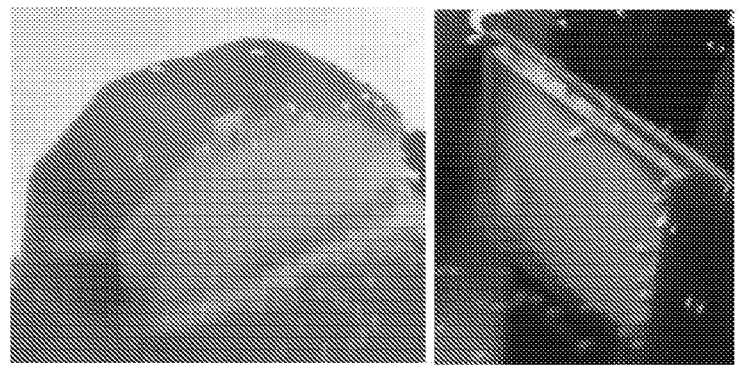
Figure 11E:
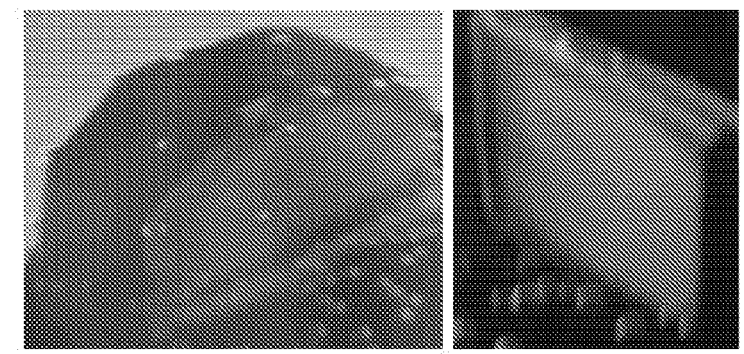
Figure 12A:
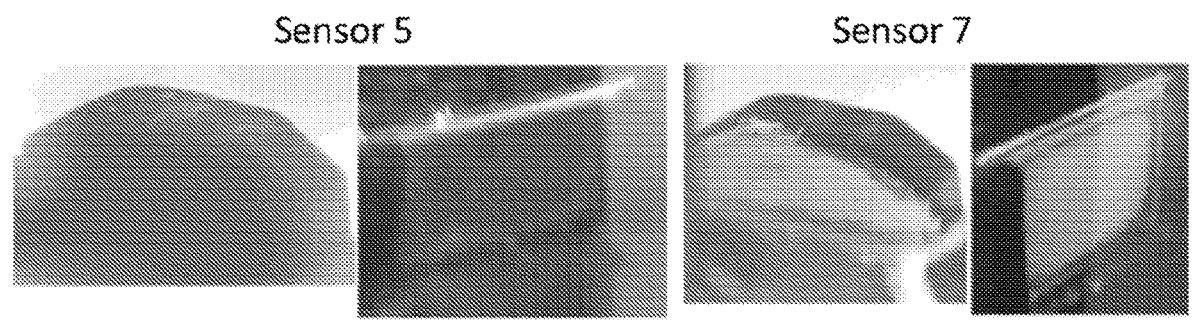
FIGS. 12A-12D are images of Sensor 7 and Sensor 5 (uncoated baseline) during bubble nucleation analysis. Images were taken at the start of the bubble nucleation assay (FIG. 12A) and at 2 hours (FIG. 12B), 4 hours (FIG. 12C) and 24 hours (FIG. 12D) during the assay.
Figure 12B:
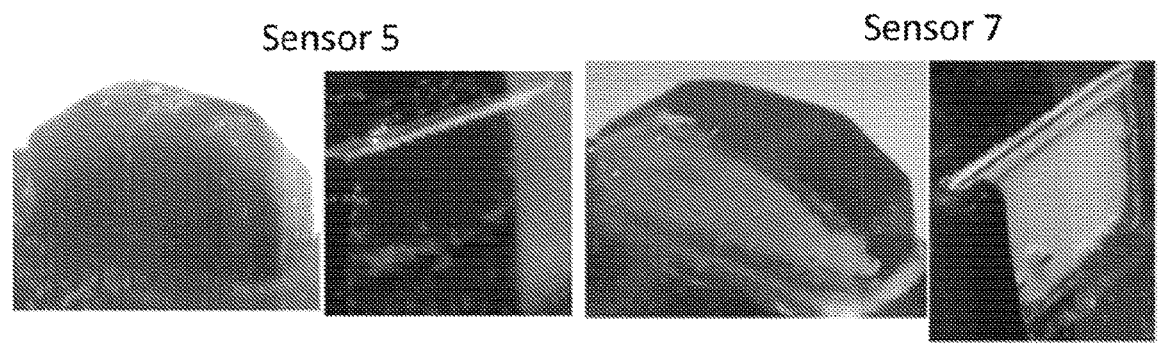
Figure 12C:
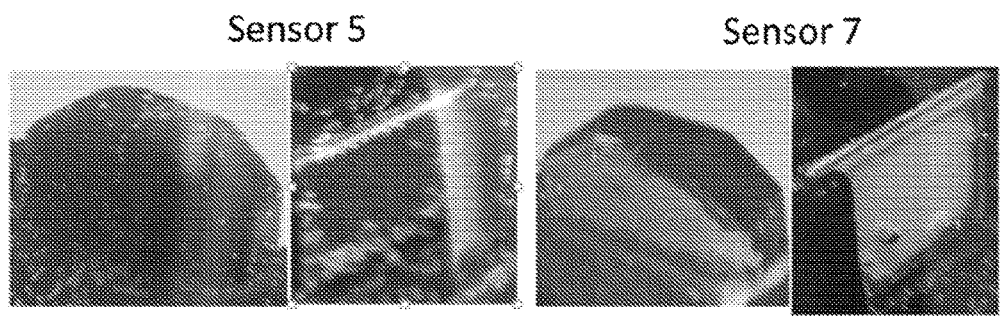
Figure 12D:
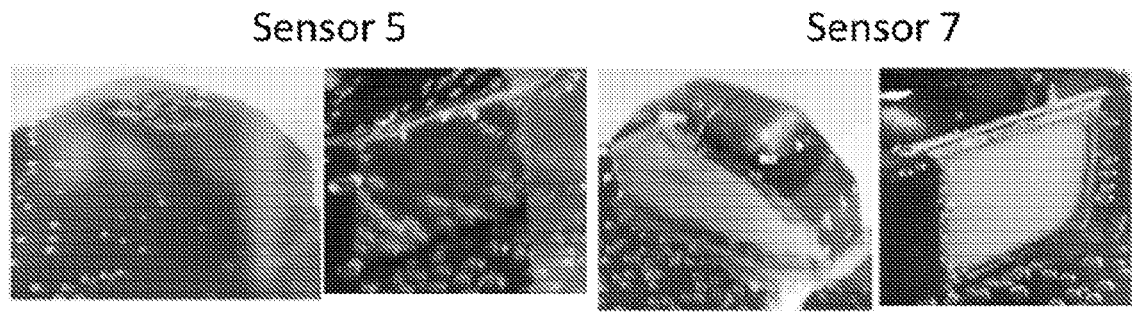

As an initial test, Sensor 7 (FIG. 11A), coated with a composition described herein, was analyzed by the bubble nucleation test. After two hours (FIG. 11B) bubbles began to form. Even after 24 hours, there was not much change observed to the sensor or the surrounding submersion fluid (FIGS. 11C and 11D).

Figure 13A:
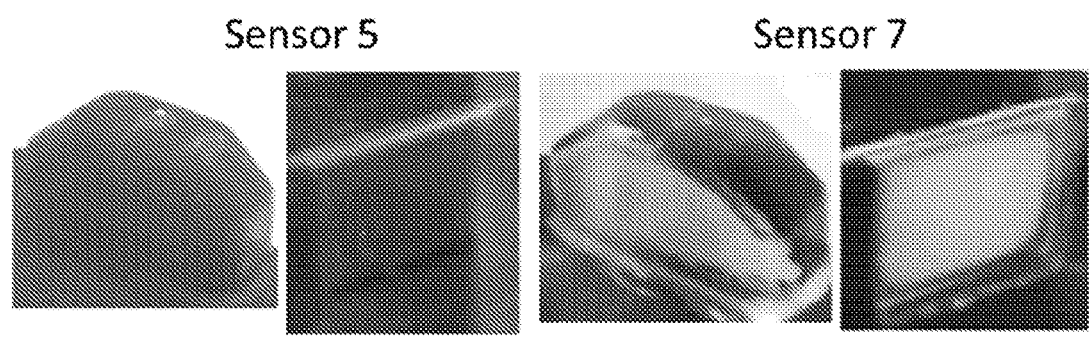
FIGS. 13A-13E are images of Sensor 7 and Sensor 5 (uncoated baseline) during bubble nucleation analysis. Images were taken at the start of the bubble nucleation assays (FIG. 13A) and at 2 hours (FIG. 13B), 4 hours (FIG. 13C), 6 hours (FIG. 13D) and 72 hours (FIG. 13E) during the assay.
Figure 13B:
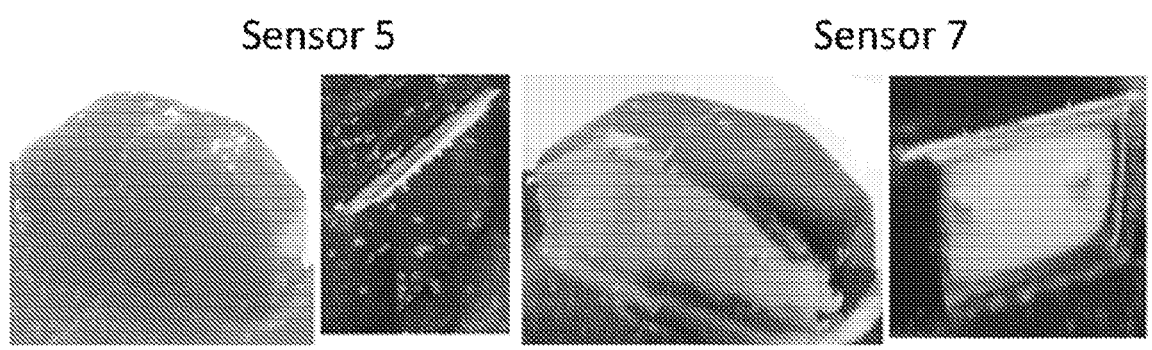
Figure 13C:
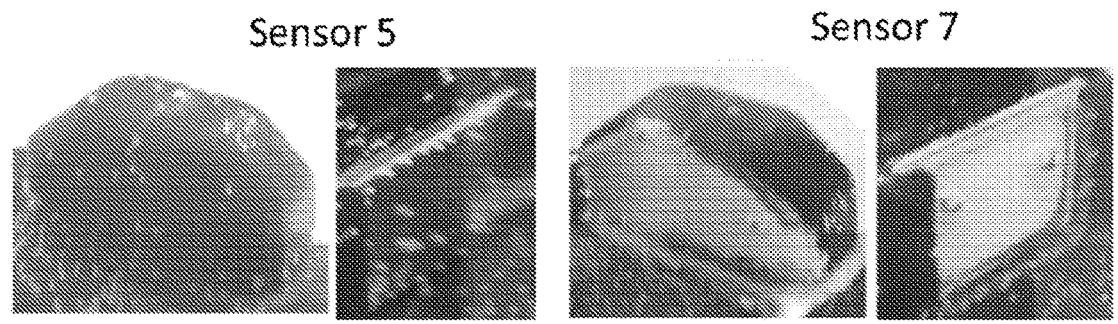
Figure 13D:
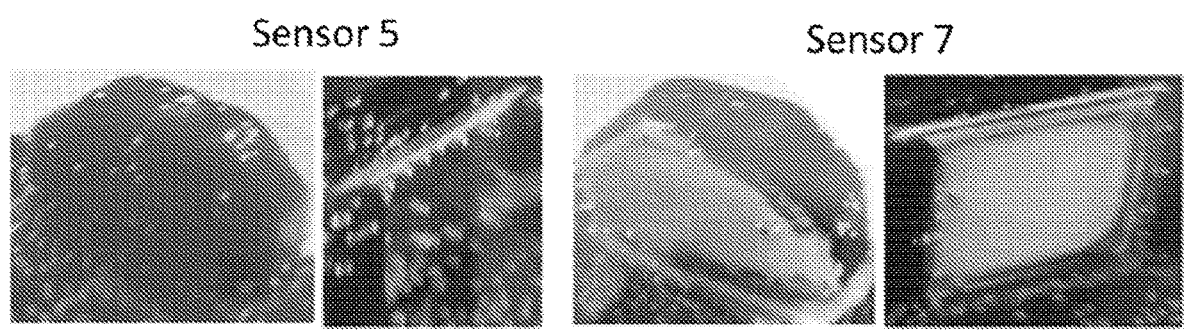
Figure 13E:
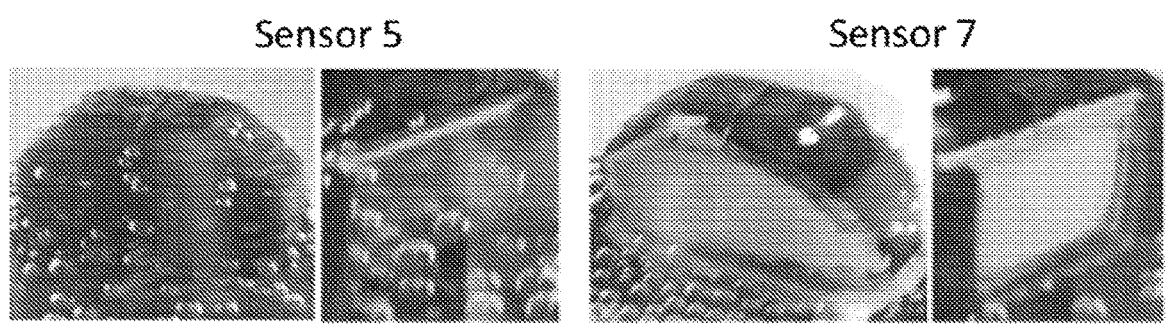
Figure 14A:
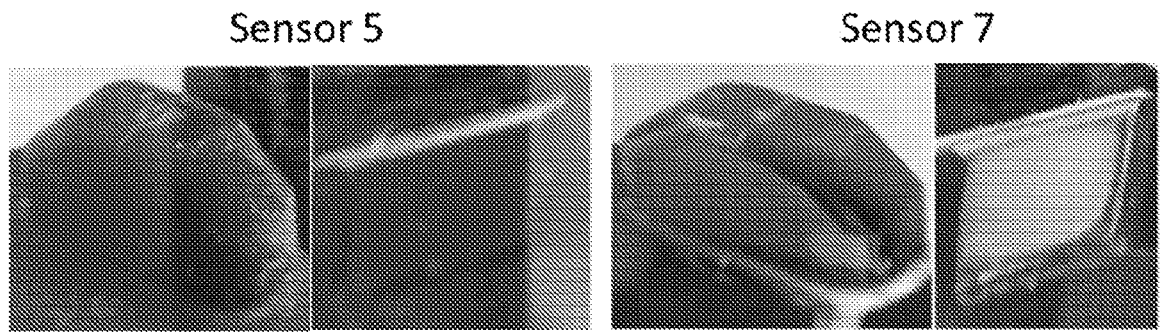
Figure 14B:
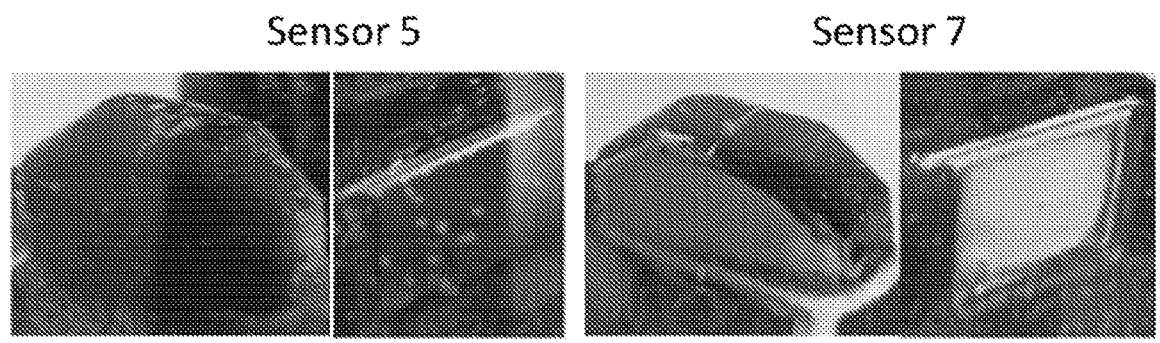
Figure 14C:
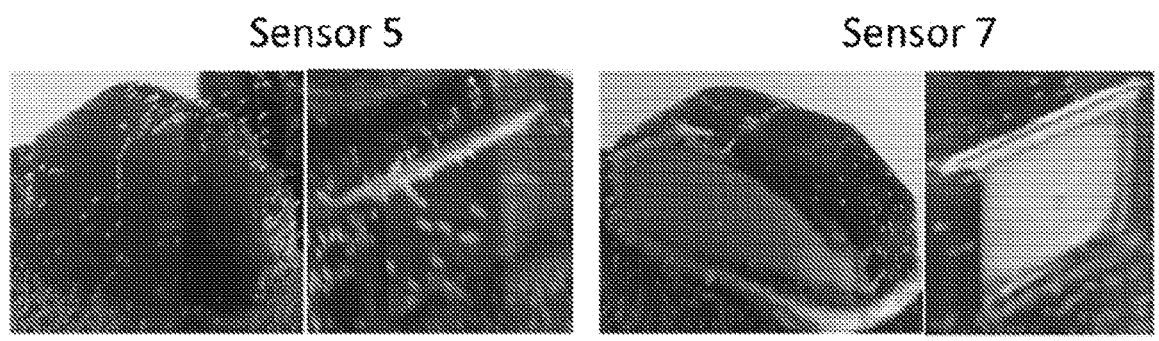

A series of tests were run with Sensor 7 and a baseline sensor, Sensor 5, which was not coated. After two hours, bubbles were forming with the baseline sensor showing greater bubble development (FIGS. 12A-12B, 13A-13B and 14A-14B). After 24 hours, the baseline sensor was exhibiting the most bubbles (FIGS. 12C-12D and FIGS. 14C-14E). After 72 hours, Sensor 7 consistently showed fewer bubbles than the baseline sensor (FIGS. 13C-13E). Sensor 7 performed fairly well and consistently throughout the nucleation test.

Resistance Against Media.

The sensors were mounted in a glass jar. The tank was filled with aged Diesel Exhaust Fluid (DEF) until the concentration tombstone was covered. The jar was placed in an oven at 60° C. for 12 days. Every 24 hours, each sensor was removed and the reflector and tombstone were analyzed for any signs of degradation or overall changes to the sensor coating. The DEF solution was also analyzed for any signs of the coating dissolving into solution such as fluid color change or particles in the fluid.

Figure 15B:
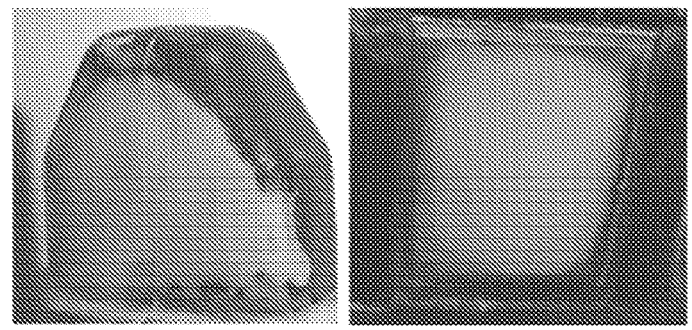
Figure 15C:
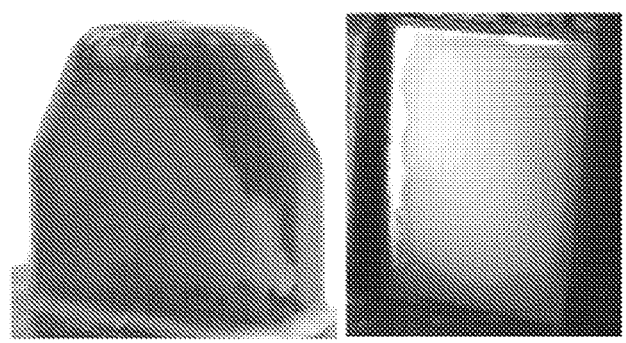
Figure 15D:
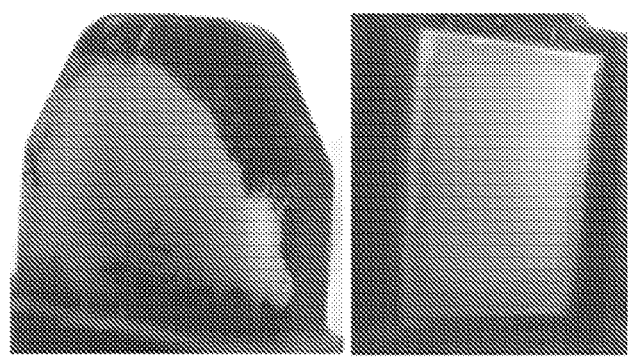
Figure 15E:
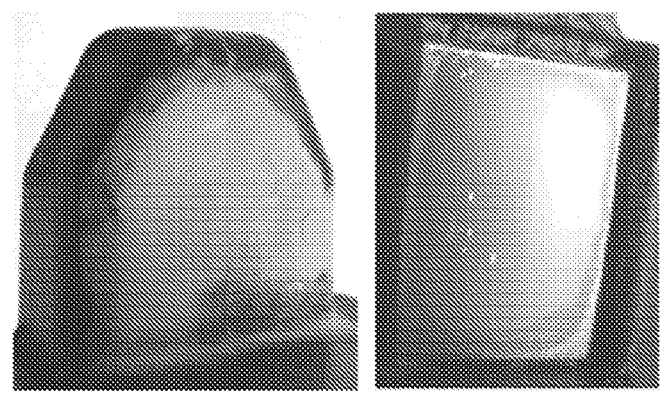
Figure 15F:
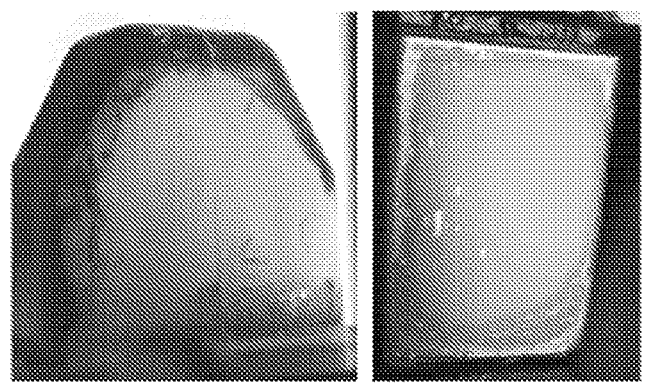
Figure 15G:
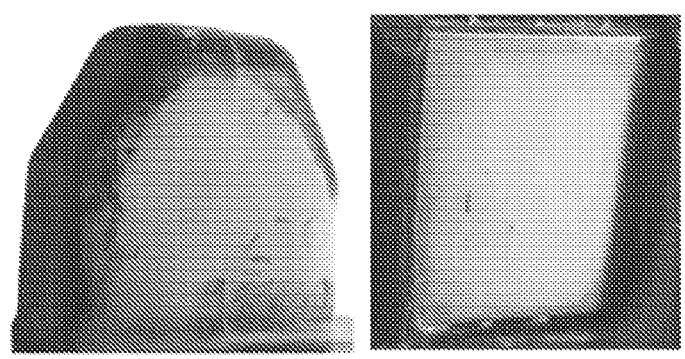
Figure 15H:
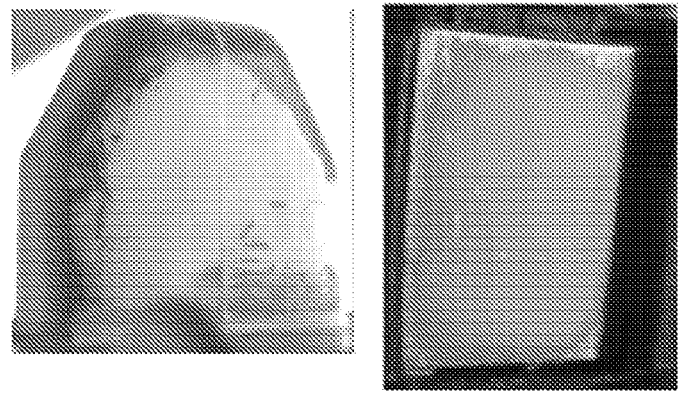
Figure 15I:
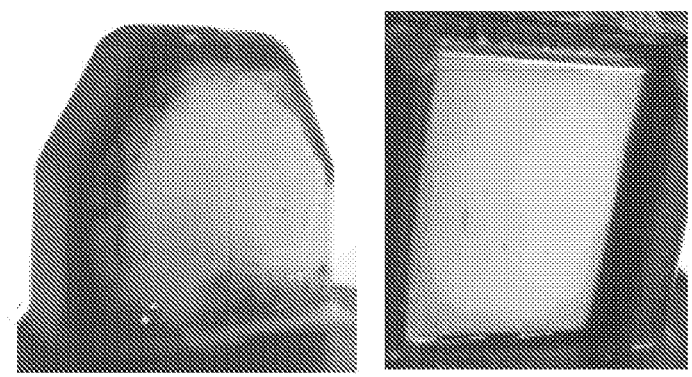
Figure 15J:
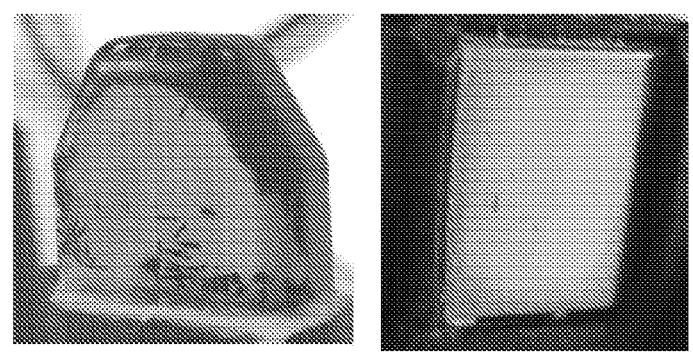

After 2 and 3 days (FIGS. 15A-15D), some small degradation in the amount of coating on Sensor 7 was suspected. After 6 and 7 days (FIGS. 15E-15F) there were further signs of degradation on the coating of Sensor 7. After five more days (FIGS. 15G-15J), no significant changes were seen from the degradation identified on day 7.

Example 6. Potable Water Test

Water meters coated with the coating compositions described herein may be tested under NSF/ANSI Standard 61, as Section 8 devices. The protocol for the test calls for 19 days of exposure, with static water conditions that are changed every day. Day 19 extraction waters are then tested for a series of organics and inorganics.

While several embodiments of the present invention have been described and illustrated herein, it is to be understood that the foregoing embodiments are presented by way of example only and that, within the scope of the appended claims and equivalents thereto, the invention may be practiced otherwise than as specifically described and claimed.

For reasons of completeness, various aspects of the invention are set out in the following numbered clauses:

Clause 1. A coating composition comprising:
(a) a ternary polymer composition comprising
  (i) a fluoropolymer comprising a polyethylene backbone optionally containing one or more double bonds, the polyethylene backbone being substituted with a plurality of fluoro groups and optionally a plurality of oxygen atoms;
  (ii) a plurality of fluoroalkyl(poly)propionyl groups grafted to the polyethylene backbone; and
  (iii) one or more epoxy resin moieties linked to the polyethylene backbone through an oxygen atom; and
(b) a fluoroalkyl-modified particle.

Clause 2. The coating composition of clause 1, wherein the fluoropolymer is a dehydrofluorinated polyvinylidene fluoride polymer.

Clause 3. The coating composition of clause 1 or 2, wherein the ternary polymer comprises a plurality of units selected from the group consisting of

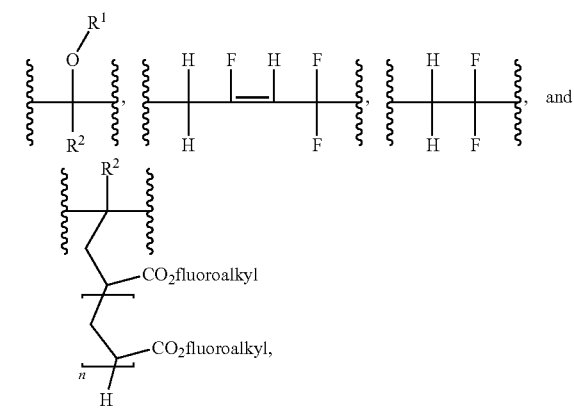

wherein $R^1$ is the epoxy resin moiety; each $R^2$ is independently hydrogen or fluoro; and n is $\geq 0$.

Clause 4. The coating composition of any of clauses 1-3, wherein the fluoroalkyl(poly)propionyl group has a formula

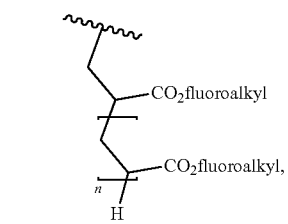

wherein n is $\geq 0$.

Clause 5. The coating composition of any of clauses 1-4, wherein the one or more epoxy resin moieties have a number average molecular weight of 350 to 1500.

Clause 6. The coating composition of any of clauses 1-5, wherein the one or more epoxy resin moieties comprise bisphenol A.

Clause 7. The coating composition of any of clauses 1-6, wherein at least one of the one or more epoxy resin moieties has formula (II)

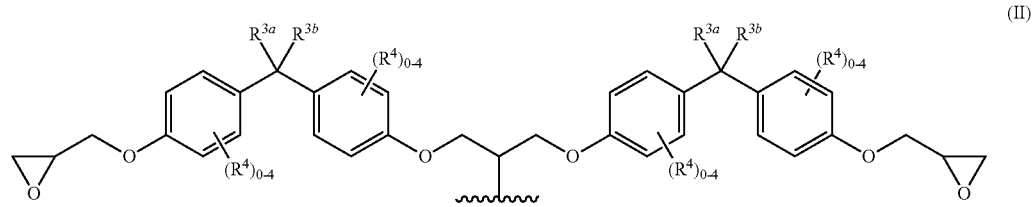

wherein

R$^{3a}$ and R$^{3b}$, at each occurrence, are independently hydrogen, C$_{1-4}$alkyl, C$_{1-4}$haloalkyl, C$_{3-6}$cycloalkyl, or —C$_{1-3}$alkylene-C$_{3-6}$cycloalkyl, or independently R$^{3a}$ and R$^{3b}$ together with the carbon atom to which they attach form a C$_{3-6}$cycloalkyl, wherein each C$_{3-6}$cycloalkyl is optionally substituted with 1-4 substituents independently selected from the group consisting of halogen, C$_{1-4}$alkyl, and C$_{1-4}$haloalkyl;

R$^{4}$, at each occurrence, is independently halogen, cyano, C$_{1-4}$alkyl, or C$_{1-4}$haloalkyl.

Clause 8. The coating composition of clause 7, wherein at least one of the one or more epoxy resin moieties has formula (II-a)

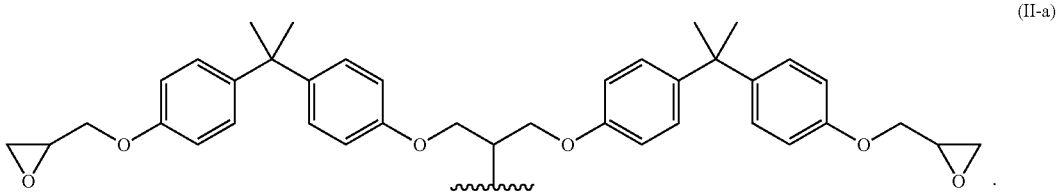 [SMILES: *C(COc1ccc(C(C)(C)c2ccc(OCC3CO3)cc2)cc1)COc1ccc(C(C)(C)c2ccc(OCC3CO3)cc2)cc1]

(II-a)

Clause 9. The coating composition of clause 7, wherein at least one of the one or more epoxy resin moieties has formula (III)

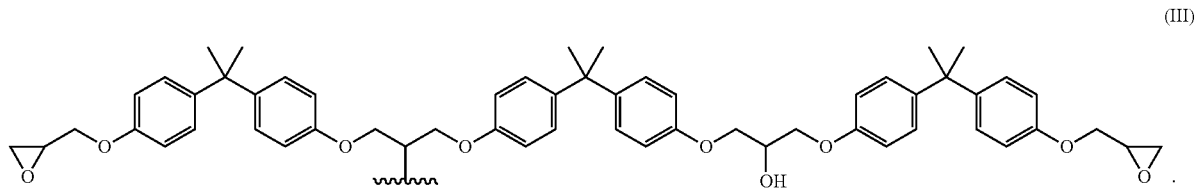 [SMILES: *C(COc1ccc(C(C)(C)c2ccc(OCC(O)COc3ccc(C(C)(C)c4ccc(OCC5CO5)cc4)cc3)cc2)cc1)COc1ccc(C(C)(C)c2ccc(OCC3CO3)cc2)cc1]

(III)

Clause 10. The coating composition of any of clauses 1-10, wherein the fluoroalkyl-modified particle is a fluoroalkyl-modified activated carbon.

Clause 11. The coating composition of any of clauses 1-10, wherein the fluoroalkyl-modified particle is a fluoroalkyl-modified silica.

Clause 12. The coating composition of any of clauses 1-11, wherein the fluoropolymer consists essentially of the polyethylene backbone optionally containing one or more double bonds, the polyethylene backbone being substituted with the plurality of fluoro groups and optionally the plurality of oxygen atoms.

Clause 13. The coating composition of any of clauses 1-11, wherein the fluoropolymer consists of the polyethylene backbone optionally containing one or more double bonds, the polyethylene backbone being substituted with the plurality of fluoro groups and optionally the plurality of oxygen atoms.

Clause 14. A coating composition prepared by reacting a dehydrofluorinated polyvinylidene fluoride polymer with a fluoroalkylacrylate, a radical initiator, an epoxy resin, and a fluoroalkyl-modified particle.

Clause 15. The coating composition of clause 14, wherein the dehydrofluorinated polyvinylidene fluoride is prepared by dehydrofluorination of polyvinylidene fluoride.

Clause 16. The coating composition of clause 15, wherein the polyvinylidene fluoride has a weight average molecular weight of about 50,000 to about 1,000,000.

Clause 17. The coating composition of any of clauses 14-16, wherein the fluoroalkylacrylate is H$_2$C=C(H)—CO$_2$C$_{8-15}$fluoroalkyl.

Clause 18. The coating composition of any of clauses 14-17, wherein the radical initiator is as azo polymerization initiator.

Clause 19. The coating composition of any of clauses 14-18, wherein the epoxy resin comprises bisphenol A.

Clause 20. The coating composition of clause 19, wherein the epoxy resin has formula (I)

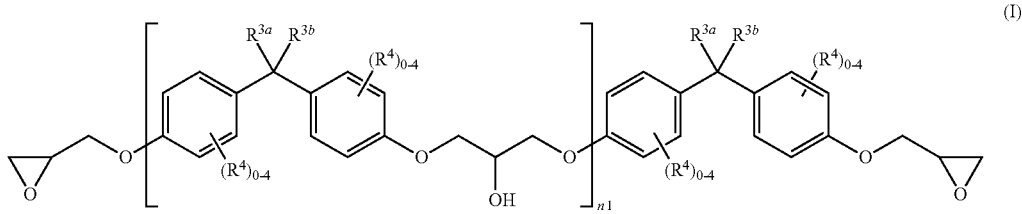

wherein
$R^{3a}$ and $R^{3b}$, at each occurrence, are independently hydrogen, $C_{1-4}$alkyl, $C_{1-4}$-haloalkyl, $C_{3-6}$cycloalkyl, or $C_{1-3}$alkylene-$C_{3-6}$cycloalkyl, or independently $R^{3a}$ and $R^{3b}$ together with the carbon atom to which they attach form a $C_{3-6}$cycloalkyl, wherein each $C_{3-6}$cycloalkyl is optionally substituted with 1-4 substituents independently selected from the group consisting of halogen, $C_{1-4}$alkyl, and $C_{1-4}$haloalkyl;
$R^4$, at each occurrence, is independently halogen, cyano, $C_{1-4}$alkyl, or $C_{1-4}$haloalkyl; and n1 is 0-5.

Clause 21. The coating composition of any of clauses 14-20, wherein the fluoroalkyl-modified particle is prepared from a fluoroalkylcarboxylic acid and a particle.

Clause 22. The coating composition of any of clauses 14-21, wherein the particle is activated carbon.

Clause 23. The coating composition of any of clauses 14-20, wherein the particle is silica.

Clause 24. The coating composition of any of clauses 14-23, wherein the reaction is a one-pot reaction.

Clause 25. The coating composition of any of clauses 14-24, wherein the reaction is conducted in an organic solvent at from 60-100° C.

Clause 26. The coating composition of any of clauses 1-13, prepared according to any of clauses 14-25.

Clause 27. A method of preparing a coating composition comprising reacting a dehydrofluorinated polyvinylidene fluoride polymer with a fluoroalkylacrylate, a radical initiator, an epoxy resin, a fluoroalkylcarboxylic acid, and a particle according to any of clauses 14-25.

Clause 28. A method of coating an article comprising contacting the article with the coating composition of any of clauses 1-25.

Clause 29. The method of clause 28, wherein the article is contacted with the coating composition by immersion coating, spray coating gravure coating, metering rod coating, knife over roll coating, slot orifice coating, or curtain coating.

Clause 30. An article coated with the coating composition of any of clauses 1-25.

Clause 31. The article of clause 30, wherein the article is a sensor.

Clause 32. The article of clause 31, wherein the sensor is a temperature ultrasonic level and concentration sensor.

Clause 33. The article of clause 30, wherein the article is a water meter.

What is claimed is:

1. A coating composition comprising:
    (a) a ternary polymer composition comprising
        (i) a fluoropolymer comprising a polyethylene backbone optionally containing one or more double bonds, the polyethylene backbone being substituted with a plurality of fluoro groups and optionally a plurality of oxygen atoms;
        (ii) a plurality of fluoroalkyl(poly)propionyl groups grafted to the polyethylene backbone; and
        (iii) one or more epoxy resin moieties linked to the polyethylene backbone through an oxygen atom; and
    (b) a fluoroalkyl-modified particle.

2. The coating composition of claim 1, wherein the fluoropolymer is a dehydrofluorinated polyvinylidene fluoride polymer.

3. The coating composition of claim 1, wherein the ternary polymer comprises a plurality of units selected from the group consisting of

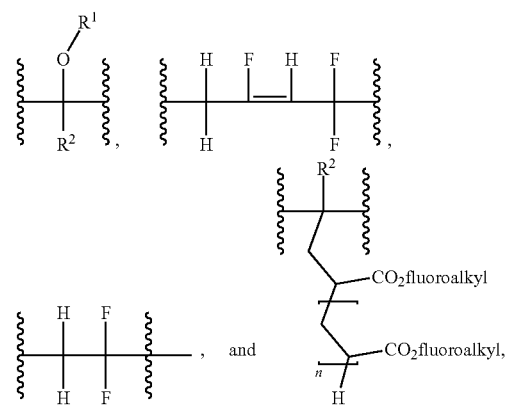

wherein $R^1$ is the epoxy resin moiety; each $R^2$ is independently hydrogen or fluoro; and n is $\geq 0$.

4. The coating composition of claim 1, wherein the fluoroalkyl(poly)propionyl group has a formula

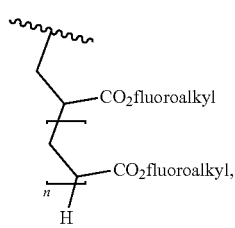

wherein n is $\geq 0$.

5. The coating composition of claim 1, wherein the one or more epoxy resin moieties have a number average molecular weight of 350 to 1500.

6. The coating composition of claim 1, wherein the one or more epoxy resin moieties comprise bisphenol A.

7. The coating composition of claim 1, wherein at least one of the one or more epoxy resin moieties has formula (II)

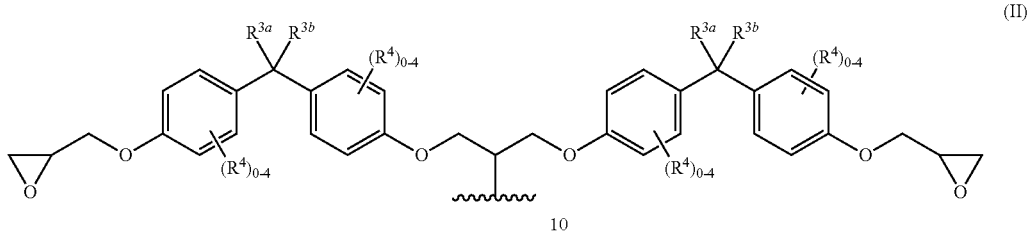

wherein
R³ᵃ and R³ᵇ, at each occurrence, are independently hydrogen, $C_{1-4}$alkyl, $C_{1-4}$haloalkyl, $C_{3-6}$cycloalkyl, or —$C_{1-3}$alkylene-$C_{3-6}$cycloalkyl, or independently R³ᵃ and R³ᵇ together with the carbon atom to which they attach form a $C_{3-6}$cycloalkyl, wherein each $C_{3-6}$cycloalkyl is optionally substituted with 1-4 substituents independently selected from the group consisting of halogen, $C_{1-4}$alkyl, and $C_{1-4}$haloalkyl;

R⁴, at each occurrence, is independently halogen, cyano, $C_{1-4}$alkyl, or $C_{1-4}$haloalkyl.

8. The coating composition of claim 7, wherein at least one of the one or more epoxy resin moieties has formula (II-a)

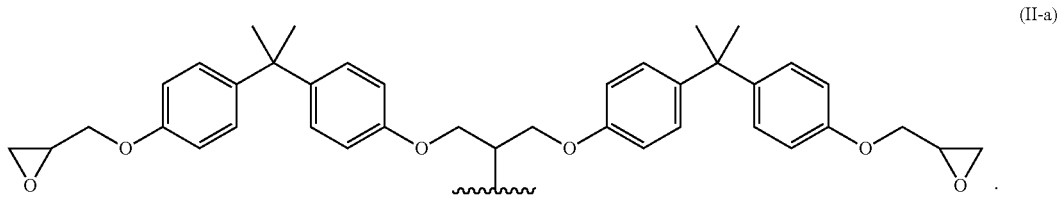 [SMILES: *C(COc1ccc(C(C)(C)c2ccc(OCC3CO3)cc2)cc1)COc1ccc(C(C)(C)c2ccc(OCC3CO3)cc2)cc1]

9. The coating composition of claim 7, wherein at least one of the one or more epoxy resin moieties has formula (III)

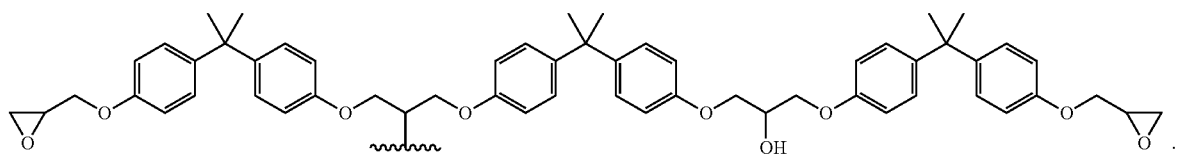

10. The coating composition of claim 1, wherein the fluoroalkyl-modified particle is a fluoroalkyl-modified activated carbon.

11. The coating composition of claim 1, wherein the fluoroalkyl-modified particle is a fluoroalkyl-modified silica.

12. The coating composition of claim 1, wherein the fluoropolymer consists essentially of the polyethylene backbone optionally containing one or more double bonds, the polyethylene backbone being substituted with the plurality of fluoro groups and optionally the plurality of oxygen atoms.

13. The coating composition of claim 1, wherein the fluoropolymer consists of the polyethylene backbone optionally containing one or more double bonds, the polyethylene backbone being substituted with the plurality of fluoro groups and optionally the plurality of oxygen atoms.

14. A method of coating an article comprising contacting the article with the coating composition of claim 1.

15. The method of claim 14, wherein the article is contacted with the coating composition by immersion coating, spray coating, gravure coating, metering rod coating, knife over roll coating, slot orifice coating, or curtain coating.

16. An article coated with the coating composition of claim 1.

17. The article of claim 16, wherein the article is a sensor.

18. The article of claim 17, wherein the sensor is a temperature ultrasonic level and concentration sensor.

19. A coating composition prepared by reacting a dehydrofluorinated polyvinylidene fluoride polymer with a fluoroalkylacrylate, a radical initiator, an epoxy resin, and a fluoroalkyl-modified particle.

20. A method of preparing a coating composition comprising reacting a dehydrofluorinated polyvinylidene fluoride polymer with a fluoroalkylacrylate, a radical initiator, an epoxy resin, and a fluoroalkyl-modified particle.

* * * * *